(12) United States Patent
Mwaura et al.

(10) Patent No.: US 12,254,686 B2
(45) Date of Patent: Mar. 18, 2025

(54) SYSTEMS AND METHODS FOR TRAJECTORY-BASED OBJECT SEARCH USING EDGE COMPUTING

(71) Applicant: Verkada Inc., San Mateo, CA (US)

(72) Inventors: David Mwaura, San Francisco, CA (US); Nitish Poddar, San Francisco, CA (US); Anders Brekke Holden, Foster City, CA (US); Bhavna Sud, Cupertino, CA (US); Michele Casertano, San Francisco, CA (US); Thantham Madan, San Mateo, CA (US); Hao Nan, Sunnyvale, CA (US); Rishabh Goyal, San Mateo, CA (US); Yingjie Shen, Hayward, CA (US); Yunchao Gong, Los Altos, CA (US); Yi Xu, Belmont, CA (US); Filip Kaliszan, Menlo Park, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/320,467

(22) Filed: May 19, 2023

(65) Prior Publication Data
US 2024/0386715 A1 Nov. 21, 2024

(51) Int. Cl.
*G06V 10/94* (2022.01)
*G06F 16/735* (2019.01)
(Continued)

(52) U.S. Cl.
CPC .......... *G06V 10/945* (2022.01); *G06F 16/735* (2019.01); *G06F 16/739* (2019.01);
(Continued)

(58) Field of Classification Search
CPC .... G06F 3/04842; G06F 3/14; G06F 16/7335; G06F 16/735; G06F 16/739; G06T 5/20;
(Continued)

(56) References Cited

U.S. PATENT DOCUMENTS 8,688,675 B2 4/2014 Albers et al.
9,361,521 B1 * 6/2016 McLean .............. G06F 3/04847
(Continued)

FOREIGN PATENT DOCUMENTS

WO WO-2020242466 A1 12/2020

OTHER PUBLICATIONS

Albers, et al. "Smart Search & Retrieval on Video Databases," IEEE, 2006, 475-476.
(Continued)

*Primary Examiner* — Katrina R Fujita
(74) *Attorney, Agent, or Firm* — COOLEY LLP

(57) ABSTRACT

A trajectory-based object search process includes receiving a user request specifying a geographic region of interest and/or a time period of interest. A set of video-derived object trajectories is identified based on the user request. At least one event is identified based on the set of video-derived object trajectories, by processing each video-derived object trajectory individually or by aggregating video-derived object trajectories, from the set of video-derived object trajectories, that overlap with respect to at least one feature. For each event, a preview image is selected that includes a thumbnail image and/or a video frame, based on the user request and using a ranking algorithm, and event metadata associated with the preview image is received. Also for each event, a video segment associated with that event is received, and the preview image and/or the video segment is caused to be displayed to a user associated with the user request.

21 Claims, 14 Drawing Sheets

(51) Int. Cl.
  *G06F 16/738* (2019.01)
  *G06T 7/246* (2017.01)
  *G06V 20/40* (2022.01)

(52) U.S. Cl.
  CPC .............. *G06T 7/248* (2017.01); *G06V 20/44* (2022.01); *G06V 20/46* (2022.01); *G06T 2200/24* (2013.01); *G06T 2207/10016* (2013.01); *G06T 2207/20092* (2013.01); *G06T 2207/30204* (2013.01); *G06T 2207/30241* (2013.01); *G06V 2201/10* (2022.01)

(58) Field of Classification Search
  CPC ................ G06T 7/248; G06T 2200/24; G06T 2207/10016; G06T 2207/20098; G06T 2207/30204; G06T 2207/30241; G06T 2207/30242; G06V 10/25; G06V 10/945; G06V 20/44; G06V 20/46; G06V 20/52; G06V 40/23; G06V 2201/02; G06V 2201/10
  See application file for complete search history.

(56) References Cited

U.S. PATENT DOCUMENTS

| | | | |
|---|---|---|---|
| 10,438,164 B1* | 10/2019 | Xiong | G06F 18/25 |
| 11,429,664 B1 | 8/2022 | Xu et al. | |
| 11,586,667 B1 | 2/2023 | Xu et al. | |
| 12,033,348 B1 | 7/2024 | Cao et al. | |
| 12,067,755 B1 | 8/2024 | Nan et al. | |
| 2006/0256210 A1* | 11/2006 | Ryall | H04N 21/854 348/231.2 |
| 2007/0257986 A1* | 11/2007 | Ivanov | G08B 13/19695 348/154 |
| 2007/0291118 A1* | 12/2007 | Shu | H04N 7/18 348/E7.085 |
| 2008/0091526 A1 | 4/2008 | Shoemaker | |
| 2009/0238411 A1 | 9/2009 | Adiletta et al. | |
| 2010/0238285 A1* | 9/2010 | Desimone | G06F 16/7328 382/103 |
| 2012/0062732 A1* | 3/2012 | Marman | G08B 13/19682 348/142 |
| 2013/0091470 A1 | 4/2013 | Sciammarella et al. | |
| 2013/0124998 A1 | 5/2013 | Pendergast et al. | |
| 2014/0369596 A1 | 12/2014 | Siskind et al. | |
| 2015/0248429 A1 | 9/2015 | Pregueiro et al. | |
| 2016/0171852 A1* | 6/2016 | Lin | G06T 7/215 382/103 |
| 2016/0232234 A1 | 8/2016 | Baek et al. | |
| 2017/0024986 A1* | 1/2017 | Austin | G06V 20/52 |
| 2017/0078767 A1* | 3/2017 | Borel | G11B 27/031 |
| 2018/0113577 A1* | 4/2018 | Burns | H04N 21/47217 |
| 2018/0115788 A1* | 4/2018 | Burns | G06V 20/41 |
| 2019/0034734 A1 | 1/2019 | Yen et al. | |
| 2019/0043201 A1 | 2/2019 | Strong et al. | |
| 2019/0244366 A1* | 8/2019 | Yu | G06N 3/045 |
| 2019/0377957 A1 | 12/2019 | Johnston et al. | |
| 2021/0027068 A1* | 1/2021 | Gayatri | H04N 7/188 |
| 2021/0233255 A1* | 7/2021 | Celestini | G06T 7/292 |
| 2022/0254162 A1* | 8/2022 | Felemban | G06V 20/49 |

OTHER PUBLICATIONS

Carta et al. "Efficient Thumbnail Identification through Object Recognition," WEBIST 2020—16th International Conference on Web Information Systems and Technologies, 2020, 209-216.

Yuan, et al. "Sentence Specified Dynamic Video Thumbnail Generation," arXiv:1908.04052v2 [cs.CV], Oct. 16, 2019, 14 pages.
Chen, L. et al. "Real-Time Multiple People Tracking with Deeply Learned Candidate Selection and Person Re-Identification," 2018 IEEE International Conference on Multimedia and expo (ICME). IEEE, 2018, 6 pages.
Co-pending U.S. Appl. No. 18/320,617, inventors Nan; Hao et al., filed May 19, 2023.
Co-pending U.S. Appl. No. 18/450,085, inventors Cao; Song et al., filed Aug. 15, 2023.
Gaikwad, B. et al. "End-to-end person re-identification: Real-time video surveillance over edge-cloud environment," Computers and Electrical Engineering, Apr. 2022, 99:107824, 14 pages.
Hata, T. et al. "Surveillance system with mega-pixel scalable transcoder," Visual Communications and Image Processing, 2007, 6508 SPIE, 13 pages.
Lu, J. et al. "Object-QA: Towards High Reliable Object Quality Assessment," arXiv preprint arXiv:2005.13116v1 [cs.CV] May 27, 2020, 9 pages.
Non-Final Office Action for U.S. Appl. No. 18/450,085 dated Oct. 31, 2023, 37 pages.
Non-Final Office Action for U.S. Appl. No. 18/320,617 dated Aug. 14, 2023, 25 pages.
Tissainayagam, P. et al. "Visual tracking with automatic motion model switching," Pattern Recognition, 2001, 34:641-660.
Notice of Allowance for U.S. Appl. No. 18/450,085 dated Feb. 29, 2024, 11 pages.
Author Unknown, "Facial Recognition in a Crowd," Kintronics IP Security Solutions, first publication date unknown [online], published at https://kintronics.com/solutions/ip-camera-systems/facial-recognition/ on Oct. 7, 2022, 4 pages.
Author Unknown, "Real-time facial recognition using your existing cameras," Oosto Facial Recognition Technology, first publication date unknown [online], published at https://oosto.com/ on Nov. 7, 2023, 6 pages.
Co-pending U.S. Appl. No. 18/643,771, inventors Sud; Bhavna et al., filed Apr. 23, 2024.
Golding et al., "Machine Learning in Distributed Edge Networks: Optimizing for Security and Latency in Surveillance Systems," Department of Electrical Engineering and Computer Sciences at UC Berkeley, 2018, 11 pages.
Kong et al., "Real-time facial expression recognition based on iterative transfer learning and efficient attention network," IET Image Processing, 2022, vol. 16, 1694-1708.
Luetto, S., "People counting using detection networks and self-calibrating cameras on edge computing," Politecnico Di Torino: Corso di Laurea in Ingegneria Matematica (Polytechnic of Turin: Degree Course in Mathematical Engineering), Dec. 2019. Retrieved online at https://webthesis.biblio.polito.it/12732/1/tesi.pdf on Apr. 25, 2024, 114 pages.
Tsakanikas, V., "Enabling artificial intelligence analytics on the edge," London South Bank University School of Engineering, 2022. Retrieved online at https://web.archive.org/web/20221208021844id_/https:/openresearch.lsbu.ac.uk/download/a8515f27c69b739d4e8eb62bf03529de322fb4b028ef8ccfa42dd2d360813aa7/4928056/Tsakanikas_thesis_library.pdf on Apr. 25, 2024, 209 pages.
Zhou et al., "Deployment of Facial Recognition Models at the Edge: A Feasibility Study," 2020 21st Asia-Pacific Network Operations and Management Symposium (APNOMS), Daegu, South Korea, 2020. Retrieved online at https://eprints.gla.ac.uk/221589/7/221589.pdf on Apr. 25, 2024, 214-219.
Notice of Allowance for U.S. Appl. No. 18/320,617 dated Apr. 2, 2024, 8 pages.
International Search Report and Written Opinion for PCT Application No. PCT/US2024/030232 mailed Sep. 18, 2024, 10 pages.

* cited by examiner

SYSTEMS AND METHODS FOR TRAJECTORY-BASED OBJECT SEARCH USING EDGE COMPUTING

FIELD

The present disclosure generally relates to the field of motion tracking using edge computing. In particular, the present disclosure is related to methods and apparatus for trajectory-based object search using edge computing.

BACKGROUND

Motion tracking can be used to monitor movement and position of objects or individuals in real-time or substantially in real-time, using sensors to capture and process data based on location, speed, and acceleration of an object or individual. Some challenges with known motion tracking technologies include inaccuracy when tracking complex movements or occlusions, latency in tracking information, and reliance on significant computing power. Additionally, some known motion tracking technologies cannot seamlessly filter specific information based on user preferences. A need therefore exists for accurately tracking objects and aggregating tracking information based on user preferences.

SUMMARY

In one or more embodiments, a non-transitory, processor-readable medium stores instructions that, when executed by a processor, causes the processor to receive a user request including a representation of at least one of a geographic region of interest or a time period of interest. Optionally, the user request can alternatively or additionally include a representation of one or more objects of interest. The non-transitory, processor-readable medium also stores instructions that cause the processor to identify, based on the user request, a set of video-derived (e.g., video stream-derived) object trajectories based on the user request. As used herein, a "trajectory" can refer to data (e.g., stored data) representing a path followed by an object in a physical space. The non-transitory, processor-readable medium also stores instructions that cause the processor to identify, based on the set of video-derived object trajectories, at least one event, by (1) processing each video-derived object trajectory from the set of video-derived object trajectories individually, or (2) aggregating video-derived object trajectories from the set of video-derived object trajectories that overlap with respect to at least one feature. The non-transitory, processor-readable medium also stores instructions that cause the processor to, for each event from the at least one event, select a preview image, based on the user request and using a ranking algorithm. The preview image includes a thumbnail image or a video frame. The non-transitory, processor-readable medium also stores instructions that cause the processor to, for each event from the at least one event, receive event metadata associated with the preview image, and retrieve, from a memory operably coupled to the processor, a video segment associated with that event. The non-transitory, processor-readable medium also stores instructions that cause the processor to, for each event from the at least one event, cause display of at least one of the preview image or the video segment to a user associated with the user request.

In one or more embodiments, a non-transitory, processor-readable medium stores instructions that, when executed by a processor, cause the processor to receive a user request including a representation of at least one of a geographic region of interest or a time period of interest. Optionally, the user request can alternatively or additionally include a representation of one or more objects of interest. The non-transitory, processor-readable medium also stores instructions that cause the processor to send a signal to cause execution of a query based on the user request. The non-transitory, processor-readable medium also stores instructions that cause the processor to receive, in response to the query, a signal representing at least one event, each event from the at least one event being associated with (1) a trajectory from a set of trajectories or (2) an aggregated set of trajectories from the set of trajectories. The non-transitory, processor-readable medium also stores instructions that cause the processor to, for each event from the at least one event, retrieve a video stream segment based on the user request and extract a preview image from the video segment. The non-transitory, processor-readable medium also stores instructions that cause the processor to generate a preview image clip that includes the preview image and the video segment. The non-transitory, processor-readable medium also stores instructions that cause the processor to cause display of the preview image clip to a user associated with the user request.

In one or more embodiments, a non-transitory, processor-readable medium stores instructions that, when executed by a processor, cause the processor to receive a set of object trajectories. The non-transitory, processor-readable medium also stores instructions that cause the processor to receive a query referencing data associated with a user request. The data includes a representation of at least one of a geographic region of interest, a time period of interest, or an object of interest. The non-transitory, processor-readable medium also stores instructions that cause the processor to filter the set of object trajectories based on the query, to produce a filtered set of trajectories. The non-transitory, processor-readable medium also stores instructions that cause the processor to identify, based on the filtered set of trajectories, at least one event. The non-transitory, processor-readable medium also stores instructions that cause the processor to, for each event from the at least one event, identify a preview image time based on a positioning of a detected object within a display area associated with the filtered set of trajectories. The non-transitory, processor-readable medium also stores instructions that cause the processor to, for each event from the at least one event, interpolate stored bounding box data associated with the preview image time to identify at least one object of interest, and cause transmission of a signal representing the object of interest, for use in generating a preview image clip that includes a video segment associated with the preview image time.

DETAILED DESCRIPTION

Figure 1:
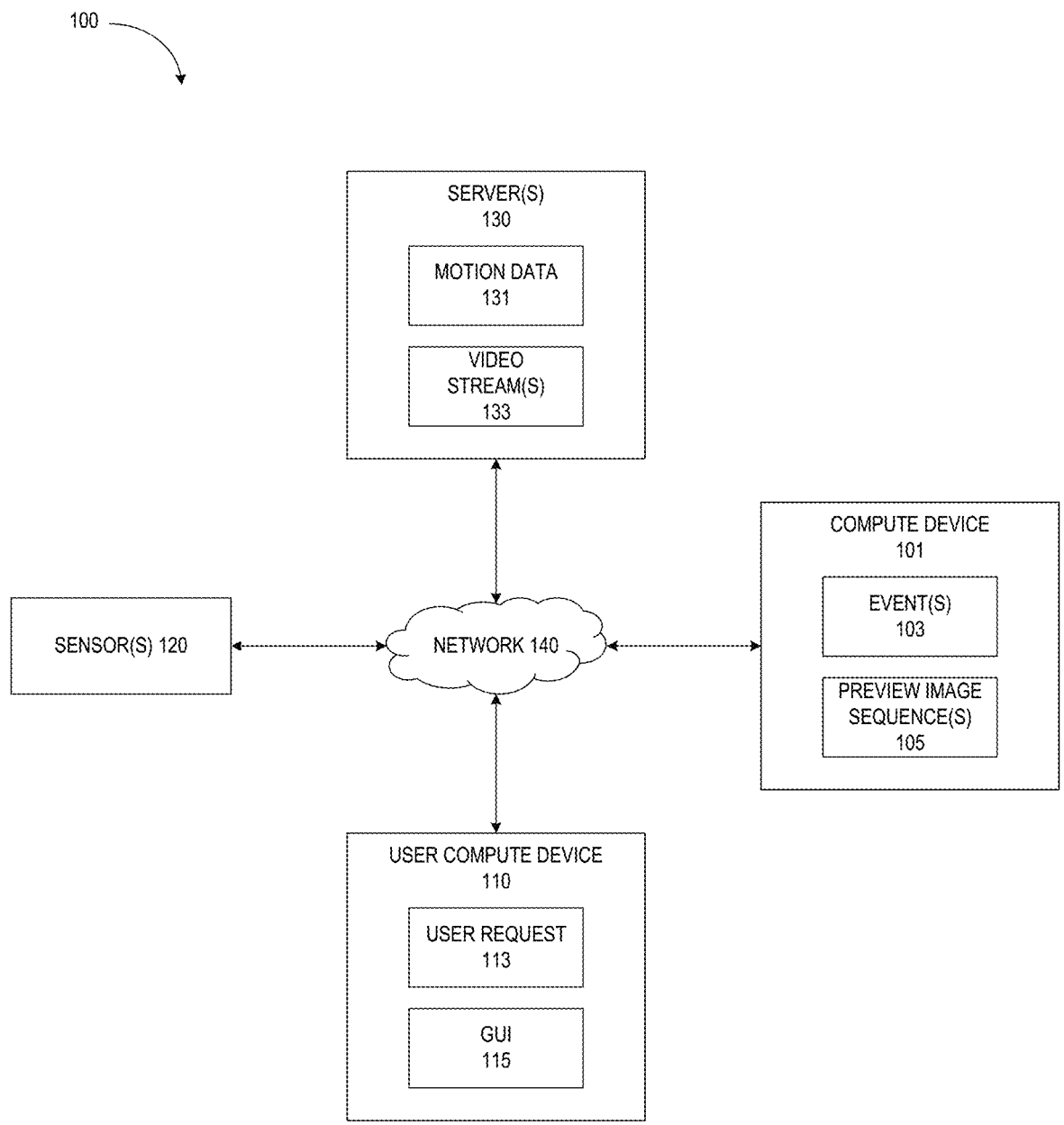
FIG. 1 is a block diagram illustrating a system for trajectory-based object search, according to some embodiments.

In some embodiments, a system for performing trajectory-based object searches includes a camera or a set of cameras having a set of sensors configured to capture images and/or video streams of one or multiple scenes. In some implementations, the camera can execute a detection algorithm (or motion detection algorithm) such as, for example, one or more object detection and tracking models, to capture images of a scene at a predetermined rate such as, for example, about 10 frames per second. The predetermined rate can be a capture rate that can be defined or selected, at least in part, to reduce latency or computational load on the camera, as contrasted with capturing images continuously for an extended period of time. In some implementations, the camera is configured to track one or more objects and classify each moving object from the one or more objects as belonging to or being part of a trajectory. As used herein, a trajectory can refer to or include a path that an object has traversed (or will have traversed, based on one or more predictions of the object's travel). In some implementations, a trajectory can also be referred to as a "video-derived object trajectory" or "object trajectory."

In some implementations, the camera can aggregate tracking information for each object (or a subset of objects) from each video/image frame of a video stream such that the same object across frames is classified and associated with a trajectory (also referred to herein as a "tracklet"). A trajectory or tracklet can include a sequence of video/image frames depicting an object of interest or a moving object. In some implementations, trajectories described herein can include or can be associated with one or more overlays, as shown and described herein. Alternatively or additionally, trajectories described herein can include information regarding where an object is positioned on that trajectory and how much of the trajectory the object has traversed/travelled and/or has not yet traversed/travelled at a specific video/image frame and/or timestamp. For example, in accordance with some embodiments of the present disclosure, once one or more trajectories are identified or generated by systems of the present disclosure, they can be overlayed across each video/image frame containing the object associated with the trajectories. One or more video/image frames for one or more trajectories can be selected, by way of example, based on detecting that the depiction of an object of interest is at or near (e.g., within a predefined number of pixels of) a center of the one or more video/image frames. Alternatively or additionally, video/image frames can be selected based on the depiction of an object of interest at the center of the trajectory, indicating that the object, at that video/image frame, has traversed half of the trajectory and has yet to traverse the other half. In some cases, trajectory overlays can include one or multiple colors to indicate, for example, a portion of a trajectory/path that has been traveled and/or a portion of a trajectory/path that has not yet traveled.

In some embodiments, a processor of the camera is configured to define/set markers on stored imagery depicting a trajectory of an object, to indicate, for example, a speed of that object. The markers may be positioned, for example, as overlays on a graphical representation of a trajectory. As one such example, a trajectory having a larger number of markers for a given time period (e.g., markers that are relatively close to each other) can indicate that the object traversed that trajectory at a slower speed than if that trajectory had a lower number of markers for a given time period (i.e., makers that are further apart from each other), or vice-versa. In some cases, the processor of the camera can be configured to set markers, e.g., within stored imagery, at positions of a moving object and/or based on a predetermined rate associated with captured video/image frames (e.g., between 0.1 and 1,000 frames per second). For example, each marker can be identical in shape, size, and/or color, and placed where an object is located based on the predetermined rate associated with captured video/image frames. In some cases, one or more markers can overlap, indicating that an object was idle (or did not move) to a certain degree between one or more captured video/image frames.

In some embodiments, the camera is configured to identify multiple objects in a scene and determine moving objects and static objects based on location of objects (e.g., pixel locations) across multiple frames and/or trajectories for the objects. In other words, objects that without trajectories can be determined to be stationary and/or static objects (e.g., idle people, parked cars, trees, etc.). The camera can filter static objects from moving objects. In some implementations, the camera can perform post-processing of the filtered data to confirm that objects are static or moving. For example, the post-processing can include a motion grid overlap check in which the processor of the camera can use computer vision and/or motion tracking to determine if two or more objects in a recorded video segment or frame are overlapping or colliding with each other. The processor of the camera can divide each video/image frame into a grid of cells and then calculate the feature vectors for each cell. The feature vectors can include information describing positions of objects and/or how the positions of the objects changes over type. The information in the feature vectors can include a two-dimensional (2D) vector describing magnitude and/or direction. In some implementations, the processor of the camera can compare feature vectors for neighboring cells in the grid to determine if two or more objects are overlapping and/or intersecting with each other. Objects across video/image frames that nearly completely overlap each other can indicate that those objects are the same object. Intersecting objects across video/image frames (or to some degree of overlap) can indicate motion of a singular object.

In some embodiments, the camera is configured to determine whether an object is "significant" (e.g., detected as being or projected to be an object of interest, for example as defined based on a user selection/request) and/or is configured to determine whether that object is stationary, moving, and/or in front of (or behind) another object. For example, the processor of the camera can generate and overlay bounding boxes over objects for each video/image frame and score, via a scoring algorithm, each bounding box (and/or each object in each bounding box). In some cases, the score for a bounding box (or object) in a video/image frame can be based on information about that bounding box (or object) in previous video/image frames. For example, an object that stays at the same location and/or position as that same object in a previous video/image frame (or previous video/image frames) can be assigned the same score based on no change being detected to a feature vector for that object, indicating that no motion occurred, which can be interpreted by the processor of the camera as being stationary. In some cases, objects that are detected, based on their position(s), as moving closer to or further from the camera can have changing scores based on changing feature vectors for that object, which can indicate that that object is moving. In some instances, the processor of the camera can determine that an object is behind/occluded by another object in a particular video/image frame, and can maintain the bounding box for that object until it reappears in a different video/image frame. Bounding boxes (or objects) that are covered by another object from the vantage point of the camera may be assigned a lower score. In some cases, objects that are stationary can be assigned a lower score than objects that are moving.

In some embodiments, the processor of the camera can be configured to determine whether an object is stationary or moving based, at least in part, on environmental context. For example, the camera can capture a moving car that parks at a parking spot and remains parked for an extended period of time. The processor can designate the car as stationary once it is parked. In some cases, the processor of the camera can also designate a parked car as stationary until a driver moves the car, at which time that car is subsequently determined to be moving. In some cases, the processor of the camera can determine whether cars are stationary or moving based, at least in part, on a status of one or more traffic lights. For example, the processor can designate/classify a car as moving, despite being stationary for some period of time, based on traffic signal information (e.g., that a traffic signal is currently red). This functionality can serve to reduce computational overhead, for example when tracking multiple objects in a video stream, some of which may become stationary for an extended period of time.

In some embodiments, multiple cameras can be configured to continuously capture video streams of different scenes such that a compute device can stitch video/image frames from each video stream (and/or from stored images) captured by each camera together to track moving objects that travel from one scene captured by one camera to a different scene captured by a different camera. In some embodiments, trajectories and/or tracklets of an object that appears in different scenes from different cameras can be aggregated and/or combined to produce a combined "track" for that object (i.e., a complete path for that object). It is to be understood that methods and/or processes performed by the processor of the camera(s) can likewise be performed, in whole or in part, and alternatively or in addition, by a processor at a different location than of the camera(s) (e.g., server(s), remote compute device(s), etc.) but operably coupled to/in communication with that camera.

In some embodiments, a camera is configured to perform edge computing to process and/or analyze object data such that the data can be processed on/at the camera instead of at a centralized/remote location. Such functionality can facilitate the rapid/time-efficient identification of moving objects, tracking of moving objects, and/or generation of data associated with moving objects in real-time or substantially in real-time, without the need to transmit large amounts of data to a centralized location for analysis, thereby reducing latency and/or improving motion detection speed. Cameras of the present disclosure, in accordance with some embodiments, can be deployed on/within various environments or infrastructures such as, for example, streetlights, buildings, roofs, and/or the like, to monitor traffic, pedestrian activity, and/or environmental conditions. Objects can be detected locally (e.g., at the location of the camera and/or within the environment of the camera). In addition, objects can be tracked and/or traffic of objects can be determined, in real-time or substantially in real-time. As used herein, "substantially in real-time" can refer to an event that occurs immediately following a predicate event, adjusted for processing-related delays (e.g., computation delay, transmission delay, etc.).

In some embodiments, an apparatus can be configured to detect objects, track moving objects, filter out static objects, and/or generate trajectories for moving objects to be stored in a data storage system (e.g., a database). Information captured and/or processed by the camera can be stored in an organized manner and accessed/used to present specific desired information to user about objects, regions of interest in a scene, regions of interest within a time window, and/or the like.

In some embodiments, an apparatus can include a compute device configured to process user requests and present a visualization of results generated based on video segments from video streams captured by cameras, based on one or more user-defined preferences. In some implementations, the compute device can include a backend (e.g., a server) that is located remote from a set of one or more cameras that are capturing data of various scenes. The compute device can be configured to execute a migration of data (e.g., video streams, video/image frames, object detections, trajectories, etc.) received from the set of one or more cameras that are located remote from (but communicatively coupled to) the compute device. In some implementations, the compute device can store any information from the set of cameras to a data storage system (e.g., a cloud database, one or more local databases, etc.). In some implementations, the compute device can organize information received from the set of one or more cameras into a table or other format describing/specifying specific camera type, camera ID, timestamp of video/image frames captured by specific cameras, identifiers for specific objects, trajectories, and/or tracks of specific objects, object type, bounding box data, and/or the like.

In some implementations, the compute device can receive user requests. The user requests can include requests for information about a specific region of interest in a scene, a specific object of interest found in a scene, a specific time window, and/or the like. In other words, the compute device can process data stored in a database to present to a user a visualization of information compliant with the user request. Information can thus be processed and presented efficiently and in a desired (e.g., tailored, excerpted, reduced size, etc.) format instead of a presenting a list of long video streams (or the long video streams themselves) to users for interpretation/sorting themselves. In other words, the compute device can highlight specific objects of interest, trajectories of specific objects of interests, and/or image sequences of video/image frames relevant to the user requests and preferences such that the users do not have to locate the information themselves.

In some implementations, a processor at a compute device can query a database to retrieve information representing at least one trajectory from a set of trajectories (e.g., trajectory data) that satisfies a user request. For example, if the user request includes at least one condition specifying information about a specific person, the compute device can retrieve data representing trajectories (e.g., tracklets, tracks, paths, etc.) of or associated with that person. In some implementations, the processor can aggregate data representing the set of trajectories, which can include at least one feature from the user request (e.g., a specific object of interest, a specific region of interest, a specific timestamp, a number of objects, etc.) based on trajectory data (e.g., bounding box data, time window, etc.) to identify at least one event. In some implementations, an event can also be referred to herein as an "object event." In some implementations, an event can be or include a sequence of video/image frames that matches/ satisfies the user request. In other words, an event can include a visual representation of trajectories that best satisfy the user request. For example, if a user request specifies, as a condition, a specific person, the compute device can aggregate trajectories captured and stored in the database that depict that person, to form an event (i.e., an event of interest). In some implementations, the event can be formed based on an aggregation of detections that satisfies the user request (e.g., a specific object of interest, a specific region of interest, a timeframe of interest, etc.).

In some cases, events can overlap with one another (e.g., spatially and/or temporally) and/or can be similar to each other. Overlapping events can be combined into a single "event," for example to reduce computational overhead, save storage space, and/or reduce redundant and/or duplicate events. For example, video/image data depicting two people moving in a common direction, with substantially the same velocity, and/or within a common vicinity may originally be determined to be two events. When both people are detected to appear and/or leave a scene at the same time, and/or share similar features (e.g., motion vector, speed, location, etc.), the compute device can combine the two events into one event (e.g., storing a representation of the event in memory accordingly), with each person still distinguishable by their own bounding box and/or features.

In some embodiments, a compute device can be configured to select a preview image time, based on a user request and using a ranking algorithm. For example, information about/representations of each trajectory retrieved in response to the user request can be scored based on how well that trajectory matches or satisfies the user request. A trajectory that includes an indication of an object (or a detection of an object) closer to the center of the trajectory (or closer to the center of the video/image frame associated with the trajectory at a shared timestamp) can be ranked higher than trajectories that include an indication of the object further from the center of the image. As such, the trajectory, associated timestamp, and/or video/image frame that best visualizes the object of interest (as indicated by the user request) can be identified, isolated, and/or highlighted (e.g., returned as part of a response to the user request). In some implementations, if the user request specifies a geographic region (e.g., a region of interest), video/image frames and/or timestamps of a video segment that are associated with that geographic region and include a higher number of trajectories (e.g., more detections of objects) relative to other video/image frames and/or timestamps can be ranked/scored higher than video/image frames and/or timestamps of the video segment that include a relatively smaller number of trajectories (e.g., fewer detections of objects). As such, the trajectory that best matches/satisfies the user request can be identified and presented as part of a thumbnail image and/or video/image frame (e.g., via a graphical user interface (GUI) of a compute device, discussed further below) to the user associated with the user request. A ranking of a trajectory can correspond to a ranking of a thumbnail image and/or video/image frame of the trajectory, in which the highest ranked thumbnail image and/or video/image frame, based on the user request, can be selected as the preview image. In some cases, the preview image can be selected from one of pre-uploaded thumbnail images, or extraction of a frame from a video segment.

In some embodiments, a compute device can be configured to execute a query that references data in response to a user request and receive a filtered set of trajectories in response to the query. The compute device can further be configured to select and/or identify a preview image time based on a positioning of a detected object within a display area associated with the filtered set of trajectories. The compute device can further be configured to interpolate stored bounding box data associated with the preview image time to identify at least a bounding box of interest (e.g., the bounding box for the detected object) for at least an object of interest (specified in the user request). Interpolation can include estimating one or more locations of an object as defined by a bounding box of the object (e.g., bounding box data) at a specific point in time (e.g., preview image time). In some cases, the compute device can interpolate the stored bounding box data to fill in missing or incomplete data to generate a more accurate and/or precise location, trajectory, and/or speed of an object. For example, if an object is detected at video/image frame 1 and video/image frame 10, but not at video/image frames 2-9, the compute device can be used to estimate the position and/or at those missing video/image frames based on bounding box data (e.g., observed movement and speed of the object) in the video/image frames where it was detected.

In some embodiments, the compute device can be configured to receive, at the processor, event metadata associated with the preview image. As used herein, in some cases, the event metadata can also be referred to herein as "metadata." The event metadata can be associated with the preview image and/or the event for which the preview image is selected for. In some cases, the event metadata can include information associated with the event such as, for example, location of an object and/or trajectory specified by the event, shape of the object and/or trajectory specified by the event, size of the object and/or trajectory specified by the event, and/or the like. In some cases, the event metadata can include tracking data and motion data of an object identified in an event.

In some embodiments, the compute device can extract a video/image frame associated with at least the bounding box of interest (e.g., a thumbnail or thumbnail image) or at least the object of interest identified via at least the bounding box of interest. In some implementations, the compute device can use a bounding box of interest to generate a preview image clip that includes a video segment associated with a preview image time. In other words, the compute device can align the preview image time with a video segment saved in a database and process the video segment (e.g., using decryption, decoding, etc.) to extract the thumbnail image. In some implementations, the compute device can cause display of the preview image to a user associated with the user request. The user can be operating a user compute device. In some cases, the compute device can generate a visualization to cause display of the preview image to the user compute device.

In some embodiments, an apparatus can include a compute device configured to present a visualization of information to a user in response to a user request. For example, in response to a user request specifying one or more conditions, the user operating a user compute device can receive, via the user compute device, a representation of a grid layout of preview images that match/satisfy the user request, and the grid layout can be presented/displayed to the user via a GUI of the user compute device. The preview images within the grid layout can represent the best matches identified in response to the user request. In some implementations, each preview image in the grid layout includes or is associated with a timestamp that indicates the specific moment in time of when the video/image frame of the preview image was captured. In some implementations, each preview image in the grid layout includes information such as bounding box data, bounding box overlays, and/or trajectories (or trajectory overlays) of objects visible/appearing in the preview image.

In some embodiments, when a user hovers a cursor over and/or clicks a preview image within the GUI, the preview image can be expanded to display additional information about the preview image clip. The additional information can include a preview image clip associated with the preview image and when in the preview image clip the preview image is extracted from. The preview image clip can include a progress bar of a video stream of the preview image clip and can be set at the time of the preview image. In some implementations, the additional information can also include extracted images (e.g., cropped images, zoomed images, etc.) of objects found in the preview image clip. As such, a user viewing the preview image clip can readily obtain a clearer/larger image of objects that appear in the scene (or display area).

In some cases, the compute device can interpolate stored bounding box data to fill in missing or incomplete data to generate a more accurate and/or a more precise location, trajectory, and/or speed of an object. For example, if an object is detected at video/image frame 1 and video/image frame 10, but not at video/image frames 2-9, the compute device can estimate the position of the object at those missing video/image frames (2-9) based on bounding box data (e.g., including observed movement and speed data for the object) in the video/image frames where it was detected. The preview images in the grid presented to the user can include a predicted video/image frame that was generated via interpolation.

FIG. 1 is a block diagram illustrating a system 100 for trajectory-based object search, according to some embodiments. As shown in FIG. 1, the system 100 includes multiple compute devices such as sensor(s) 120, server(s) 130, a user compute device 110, and a compute device 101, each connected with one another via a network 140. While four devices are shown in FIG. 1, it should be understood that system 100 can include any number of sensors, servers, and/or compute devices not shown in FIG. 1.

In some implementations, the network 140 can be any type of network (e.g., a local area network (LAN), a wide area network (WAN), a virtual network, a telecommunications network) implemented as a wired network and/or wireless network and used to operatively couple the sensor(s) 120, the user compute device 110, the server(s) 130 and/or the compute device 101. In some implementations, the user compute device 110, the server(s) 130, and/or the compute device 101 can be connected to each other via an Internet Service Provider (ISP) and the Internet (e.g., the network 140). In some embodiments, a connection can be defined, via the network 140, between any two compute devices. In some embodiments, the compute devices (e.g., sensor(s) 120, user compute device 110, server(s) 130, compute device 101, etc.) can communicate with each other (e.g., send data to and/or receive data from) and with the network 140 via intermediate networks and/or alternate networks (not shown in FIG. 1). Such intermediate networks and/or alternate networks can be of a same type and/or a different type of network as the network 140.

In some implementations, the network 140 can include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 140 can be a wireless network such as, for example, a Wi-Fi or wireless local area network ("WLAN"), a wireless wide area network ("WWAN"), and/or a cellular network. In some instances, the network 140 can be a wired network such as, for example, an Ethernet network, a digital subscription line ("DSL") network, a broadband network, and/or a fiber-optic network. In some instances, the compute device 101 and can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 140 can be encrypted or unencrypted. In some instances, the network 140 can include multiple networks or subnetworks operatively coupled to one another by, for example, network bridges, routers, switches, gateways and/or the like.

In some embodiments, the sensor(s) 120 can be configured to capture information about an environment or a scene from an angle or point of view. The sensor(s) 120 can include, for example, active sensors and/or passive sensors. In some implementations, the sensor(s) 120 can include active sensors such as, for example, radar, lidar, ultrasonic sensors, infrared sensors, and/or the like. The active sensors can be configured to emit signals to detect objects and measure their distances, speeds, directions, and/or the like. In some implementations, the sensor(s) 120 can operate in dark environments. The sensor(s) 120 can include passive sensors such as, for example, optical cameras, thermal cameras, microphone, and/or the like. The passive sensors can be configured to detect changes such as temperature, pressure, windspeed, and/or the like in an environment or scene. In some cases, the sensor(s) 120 can be configured to capture objects in an indoor environment and that emit their own signals (e.g., acoustic object detection). In some implementations, the sensor(s) 120 can include multiple sensors in a sensor suite. In some cases, the sensor(s) 120 can include multiple sensors located away from each other and configured to capture video streams at different angles, point of views, and/or the like. In some implementations, the sensor(s) 120 can be described further in detail in FIG. 5.

In some embodiments, the server(s) 130 can include component(s) that are remotely located from the sensor(s) 120, the user compute device 110, and/or the compute device 101. In some implementations, the server(s) 130 can include one or more servers located at various locations and configured to provide centralized services and/or store data over the network 140. In some implementations, the server(s) 130 can include, for example, file servers, web servers, application servers, database servers, mail servers, print servers, and game servers, and/or the like. In some implementations, the server(s) 130 can store motion data 130 and video stream(s) 133. Motion data 130 can include information about movement of objects in a scene, as recorded the sensor(s) 120. In some implementations, the motion data 130 can include, for example, the position, velocity, acceleration, or trajectory of objects. In some implementations, the motion data 130 can also include tracking information about the movement of objects such as, for example, people, vehicles, or other moving objects of interest. The video stream(s) 133 can include video stream recordings captured by the sensor(s) 120. In some implementations, the video stream(s) 133 can include multiple video/image frames which can be used to extract the motion data 131.

The user compute device 110 can include a compute device configured to be operated by a user and transmit a user request 113 (or multiple user requests) to the compute device 101 via the network 140. The user request 113 can include a request of retrieval for video stream(s) and/or motion data 131 specific to at least one condition in the user request 113. The user request 113 can include a representation of at least one of a geographic region of interest, a time period of interest, an object of interest, and/or the like. The user compute device 110 can also include a graphical user interface (GUI) 115 that the user can interact, e.g., for transmitting the user request 113 (e.g., to the compute device 101) and/or for viewing results (see, e.g., FIGS. 10-11) generated in response to the user request 113.

The compute device 101 can be configured to process user request 113 and identify one or more event(s) 103 based on the motion data 131 and based on the user request 113, to generate one or more preview image clip(s) 105 based on the video stream(s) 133 and/or motion data 131. The preview image clip(s) 105 can, in turn, be sent to the user compute device 110 and displayed via the GUI 115 thereof. In some implementations, an event(s) 103 can refer to a sequence of video/image frames that satisfy one or more conditions from the user request 113. In other words, the event(s) 103 can be a visualization of trajectories of objects detected by the sensor(s) 120 that best satisfy the user request 113. For example, if a condition in the user request 113 specifies, a person, the compute device 101 can aggregate trajectories captured and stored in a database (e.g., server(s) 130) of that person, to form the event(s) 103. In some implementations, the event(s) 103 can be identified/generated based on an aggregation of detections of the object that satisfies the user request 113 (e.g., a specific object of interest, a specific region of interest, etc.). In some implementations, the compute device 101 can include the server(s) 130 or the server(s) 130 can include the compute device 101. In other words, the compute device 101 and/or the server(s) 130 can be referred to as a "backend" that is configured to store data (e.g., motion data 131, video stream(s) 133, etc.) and process the user request 113. In some implementations, the compute device 101 can receive user requests from multiple user compute devices (including user compute device 110 and other user compute devices not shown) and process the user requests in parallel, substantially in parallel, overlapping in time, concurrently and/or in real-time or substantially in real-time.

Figure 2:
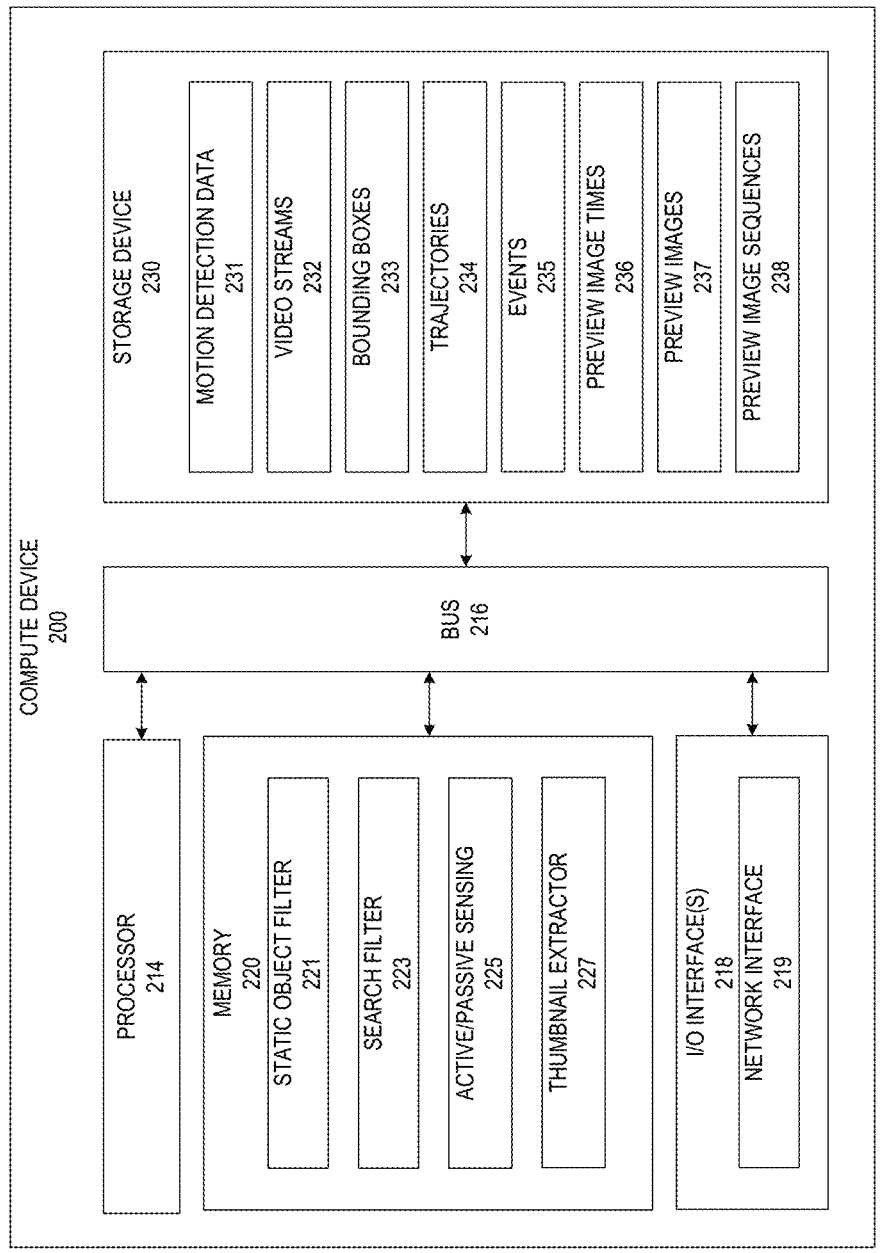
FIG. 2 is a block diagram illustrating a compute device compatible in the system of FIG. 1, according to some embodiments.

FIG. 2 is a block diagram illustrating a compute device 200 that is compatible in the system of FIG. 1, according to some embodiments. The compute device 200 can include similar components and/or can be structurally similar to the compute device 101 of FIG. 1. As shown in FIG. 2, the compute device 200 includes a processor 214, a memory 220, I/O interface(s) 218, and a storage device 230, that can communicate with each other via a bus 216. The compute device 200 can be or include, for example, a computer workstation, a terminal computer, a server computer, a handheld device (e.g., a tablet computer, a smartphone, etc.), and/or any machine capable of executing a sequence of instructions that specify an action to be taken by the compute device 200. The compute device 200 can also include multiple compute devices that can be used to implement a specially configured set of instructions for causing one or more of the compute devices to perform any one or more of the aspects and/or methodologies described herein.

The I/O interface(s) 218 of the compute device 200 can include a network interface 219. The network interface 219 can be used to connect the compute device 200 to one or more of a variety of networks and one or more remote devices connected thereto. In other words, the compute device 200 can communicate with other devices via a network (not shown in FIG. 2). I/O interface(s) 218 can be any suitable component(s) that enable communication between internal components of the compute device 200 and external devices, such as, for example, a user compute device and/or sensor(s). The network interface 219 can be configured to provide a wireless and/or wired connection to a network.

The storage device 230 can store information generated by the processor 214 and/or received at the processor 214. In some implementations, the storage device 230 can include, for example, hard disk drives (HDDs), solid-state drives (SSDs), USB flash drives, memory cards, optical discs such as CDs and DVDs, and/or the like. In some implementations, the storage device 230 can include a database (e.g., a cloud database, a local database, etc.) that can be different from the memory 220. For example, the memory 220 can be volatile, meaning that its contents can be lost when the compute device 200 is turned off. The storage device 230 can be configured to be persistent, meaning that its contents can be retained even when the compute device 200 is turned off. In some implementations, the storage device 230 can be configured to organize and manage large amounts of data, whereas the memory 220 can be configured to be used for temporary storage of data and program instructions. In some implementations, the storage device 230 can be configured to provide efficient and reliable storage and retrieval of data and can include features such as, for example, indexing, querying, and transaction management, while the memory 220 can be configured for rapid access and manipulation of data.

The storage device 230 can be configured to store motion detection data 231, video streams 232, bounding boxes, 233, trajectories 234, events 235, preview image times 236, preview images 237, preview image clips 238, and/or the like. The motion detection data 231 can include any information describing motion of an object and/or information describing an object (moving or not). In some implementations, the motion detection data 231 can include feature vectors describing positions of objects and/or how the positions of the objects change over type. The feature vectors can include, for example, two-dimensional (2D) vectors describing magnitude and/or direction of an object or objects.

The video streams 232 can include data associated with sequences of video frames and/or sequences of video/image frames recorded by one or more sensor(s)/cameras. In some implementations, the video streams 232 can include video streams captured by (and optionally stitched together using data from) multiple sensors. In some implementations, the video streams 232 can include sequences of video/image frames associated with predetermined time intervals. For example, the video streams 232 can include cropped sequences of video/image frames captured/compiled every 6 hours within a full day. In some implementations, the video streams 232 can be captured by the sensor(s) at a predetermined capture rate such as, for example, about 10 frames per second.

The bounding boxes 233 can be or include rectangles or other polygonal shapes that can be overlayed over objects found in the video streams 232 or video/image frames of the video streams 232. The bounding boxes 233 can be used to represent the location and size of the objects. In some cases, the bounding boxes 233 can be defined by their top-left corner coordinates, width, and height. In some implementations, bounding boxes 233 can be generated using any of a variety of object detection algorithms, such as, for example, region proposal networks, sliding window approaches, and/or the like. In some implementations, the bounding boxes 233 can be refined and adjusted based on post-processing techniques such as, for example, non-maximum suppression or bounding box regression. In some implementations, a bounding box can be overlayed on an object in each video/image frame of a video stream (or a subset thereof) and can be assigned a score via, for example, a ranking algorithm. Ranking algorithms compatible with embodiments of the present disclosure can include, by way of non-limiting example, one or more deterministic ranking algorithms (e.g., rank-by-feature algorithm(s), sorting algorithm(s), etc.), one or more probabilistic ranking algorithms (e.g., rank-by-confidence algorithm(s), Bayesian filters, etc.), one or more Bayesian ranking algorithms, one or more log-linear model ranking algorithms, one or more binary ranking algorithms, one or more ranking by similarity algorithms, one or more ranking by distance algorithms, one or more ranking by preference algorithms, one or more ranking by probability algorithms, etc. In some cases, the score for a bounding box (or object) in a video/image frame can be based on information about that bounding box (or object) in previous video/image frames. For example, an object that stays at the same location and/or position as that same object in a previous video/image frame (or previous video/image frames) can be assigned the same score based on no change being detected to one or more feature vectors for that object, indicating no motion, such that the object(s) is interpreted by the processor 214 to be stationary. In some cases, objects can have changing scores based on changing feature vectors for that object (e.g., based on whether the objects are determined to be moving closer to or further from the camera), which can indicate that that object is moving. In some instances, the processor 214 can determine if an object is behind another object and maintain the bounding box for that object until it reappears in a different video/image frame. Bounding boxes 233 (or objects) that are covered/obscured by another object (e.g., due to the positioning of the sensor(s)) may be assigned a lower score, or a scoring function may be temporarily paused. In some cases, objects that are stationary can be assigned a lower score than objects that are moving.

The trajectories 234 (also referred to herein as "tracklets") can be or include paths associated with objects. A trajectory can indicate a path that an object has traversed (or will have traversed). In some implementations, the processor 214 can aggregate tracking information (e.g., motion detection data 231 associated with an object) for each object (or a subset of objects) from each video/image frame of a video stream (or a subset thereof) such that the same object(s) across video/image frames are classified and associated with a common trajectory. In some implementations, the trajectories 234 can include overlays over the paths that the object travels about across video/image frames. In some implementations, one or more of the trajectories 234 can also include information indicating where an object is positioned on that trajectory and how much of that trajectory the object has passed and/or has not yet passed at a specific video/image frame. For example, once trajectories 234 are identified/generated, they can be overlayed across each video/image frame containing the object associated with the trajectories 234.

One or more video/image frames for one or more trajectories 234 can be selected, by way of example, based on detecting that the depiction of an object of interest is at or near (e.g., within a predefined number of pixels of) a center of the one or more video/image frames. Alternatively or additionally, video/image frames can be selected based on the depiction of an object of interest at the center of the trajectory, indicating that the object, at that video/image frame, has traversed half of the trajectory and has yet to traverse the other half. In some cases, trajectory overlays can include one or multiple colors to indicate, for example, a portion of a trajectory/path that has been traveled and/or a portion of a trajectory/path that has not yet traveled.

In some embodiments, a trajectory of an object can include markers to indicate, for example, a speed of that object (or movement of that object). As one such example, a trajectory having a larger number of markers (e.g., markers that are relatively close to each other) can indicate that the object traversed that trajectory at a slower speed than if that trajectory had a lower number of markers (i.e., makers that are further apart from each other), or vice-versa. In some cases, the markers on the trajectory can be set at positions of a moving object and/or based on a predetermined rate associated with captured video/image frames (e.g., about 10 frames per second).

The events 235 can be or include sequences of video/image frames that match and/or satisfy conditions of user requests. In other words, an event can include a visual representation of trajectories that best satisfy the user request. In some implementations, the processor 214 can aggregate trajectories retrieved in response to a user request and that overlap with at least one specified feature (e.g., a specific object of interest, a specific region of interest, a specific timestamp, a number of objects, etc.) based on trajectory data (e.g., bounding box data, a time window, etc.) to identify at least one event. For example, if the user request specifies a person, the processor 214 can aggregate trajectories 234 captured and stored in the storage device 230 of that person to form the event. In some implementations, the event can be formed based on an aggregation of detections that satisfies the user request (e.g., specific object of interest, specific region of interest, etc.). In some cases, some events can overlap with each other or are similar to each other. As such, overlapping events can be combined into a single event to reduce computational overhead, save storage space, and/or reduce redundant and/or duplicate events. For instance, two people moving in a common direction, at a similar velocity, and/or within a vicinity of one another may originally be determined to be two events. As both people appear and/or leave a scene at the same time and/or share one or more similar features (e.g., motion vector, speed, location, etc.), the processor 214 can combine the two events into one event while each person is still distinguished by their own bounding box and/or features.

The preview image times 236 (also referred to herein "preview image times") can include time or timestamps of specific moments or video/image frames within video streams 232 that are selected to be included within/represent a preview image clip. The preview image times 236 can be selected by the processor 214 to best visualize motion data responsive to user requests. The preview image times 236 can be selected automatically.

The preview images 237 can include specific video/image frames at the preview image times 236. In some implementations, the preview images 237 can include information that best matches/satisfies user requests. For instance, the preview images 237 can include a thumbnail image of a person of interest at the center of the thumbnail image, such that the person of interest (as specified by a user request), when displayed via a GUI of the user's compute device, is visually easy to identify. In some cases, a preview image can be or include a thumbnail image that includes information that best matches/satisfies a user request. For example, the processor 214 can identify, from the trajectories 234, multiple video/image frames that match/satisfy the user request. In some cases, a number of the video/frames that matches/satisfies the user request can be a thumbnail image to be selected as a preview image for a user request. The processor 214 can also assign a ranking to each video/image frame (or thumbnail image) that matches/satisfies the user request, in which the highest ranking video/image frame (or thumbnail image) can be selected as the preview image for an event associated with the user request.

The preview image clips 238 can include sequences of video/image frames associated with the preview images 237 and/or preview image times 236. A preview image clip can include multiple video segments from the video streams 232 that best match/satisfy a user request. In some cases, the preview image clip can include a progress bar of a video stream of the preview image clip and can be set at the time of the preview image. In some implementations, the additional information can also include extracted images (e.g., cropped images, zoomed images, etc.) of objects found in the preview image clip. As such, a user viewing the preview image clip can readily obtain a clearer/larger image of objects that appear in the scene (or display area). In some cases, a preview image can at least be selected based on a set of thumbnail images. For instance, the preview image can be or include a thumbnail image selected from the set of thumbnail images retrieved based on a user request. The thumbnail image can be or include a video/image frame from a video segment that matches/satisfies the user request. In some cases, a preview image can at least include a at least a portion of a video segment. For instance, the processor 214 can be configured to extract one or more video/image frames from a video segment of a video stream and that matches/satisfies a user request. An extracted video/image frame can be referred to as a thumbnail image, such that one or more thumbnail images can be assigned a ranking based on the user request and the thumbnail image with the highest ranking can be selected as the preview image.

The processor 214 can be or include, for example, a hardware based integrated circuit (IC), or any other suitable processing device configured to run and/or execute a set of instructions or code. For example, the processor 214 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 214 can be configured to run any of the methods and/or portions of methods discussed herein.

The memory 220 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 214 to perform one or more processes, functions, and/or the like. In some implementations, the memory 220 can include extendable storage units that can be added and used incrementally. In some implementations, the memory 220 can be a portable memory (e.g., a flash drive, a portable hard disk, and/or the like) that can be operatively coupled to the processor 214. In some instances, the memory 220 can be remotely operatively coupled with a compute device (not shown); for example, a remote database device can serve as a memory and be operatively coupled to the compute device. The memory 220 can include various components (e.g., machine-readable media) including, but not limited to, a random-access memory component, a read only component, and any combinations thereof. In some cases, a basic input/output system (BIOS), including basic routines that help to transfer information between components within the compute device 200, such as during start-up, can be stored in memory 220. The memory 220 can further include any number of program modules including, for example, an operating system, one or more application programs, other program modules, program data, and any combinations thereof.

The memory 220 can store instructions that can cause processor 214 to execute modules, processes, programs, devices, and/or functions such as, for example, static object filter 221, search filter 223, active/passive sensing 225, thumbnail extractor 227, and/or the like. The static object filter 221, search filter 223, active/passive sensing 225, and/or the thumbnail extractor 227 can be implemented as one or more programs and/or applications that are tied to hardware components (e.g., a sensor, an I/O device, a processor, etc.). In some implementations, the memory 220 can also store programs and/or applications associated with an operating system (e.g., power management, memory allocation, etc.).

In some implementations, active sensing 222 can include active sensing or scanning of an environment, as described herein. In some cases, active sensing 222 can include active scanning of an environment or scene and/or sensing or perceiving information associated with the environment, object(s) within the environment (e.g., humans, vehicles, bicycles, trees, etc.).

In some implementations, the static object filter 221 can be executed by the processor 214 to filter out static objects in a video stream and/or video/image frames based on motion detection. In some cases, the static object filter 221 can be caused to analyzes a video stream or sequence of images (e.g., video/image frames) and identify objects that exhibit little to no motion over time. In some implementations, the static object filter 221 can be caused to compute differences between successive video/image frames and thresholding a resulting image to highlight regions of motion. In some cases, objects that remain stationary for a predetermined period of time, such as, for example, parked cars, trees and/or the like, can appear as static regions and/or static objects which can be filtered out by setting some predetermined threshold. Alternatively or additionally, and in some implementations, other filters based on color, texture, or shape analysis can also be used to identify and exclude static objects.

In some implementations, the static object filter 221 can receive a video stream from a sensor(s) (e.g., a camera), identify multiple objects in a scene depicted within the video stream, identify/differentiate moving objects and static objects based on those objects' locations (e.g., pixel locations) across multiple frames and/or based on trajectories of those objects. In other words, objects that are without trajectories can be determined to be stationary and/or classified as static objects (e.g., idle people, parked cars, trees, etc.). The static object filter 221 can distinguish static objects from moving objects. In some cases, the processor 214 can be configured to perform post-processing of the filtered data to confirm that objects are static or moving. For instance, the post-processing can include performing a motion grid overlap check, in which the processor 214 can determine if two or more objects in a video streams are overlapping or colliding with each other. The processor 214 can divide each video/image frame into a grid of cells and calculate the feature vectors for each cell. The feature vectors can include information describing positions of objects and/or how the positions of the objects changes over type. The information in the feature vectors can include a 2D vector describing magnitude and/or direction. In some cases, the processor 214 can compare feature vectors for neighboring cells in the grid to determine if two or more objects are overlapping and/or intersecting with each other. Objects across video/image frames that nearly completely overlap each other can indicate that those objects are the same object. Intersecting objects across video/image frames (or to some degree of overlap) can indicate motion of a singular object.

The search filter 223 can be executed by the processor 214 to customize search results based on user requests. The user requests can include a request of information about a specific region of interest in a scene, specific object of interest found in a scene, specific time window, and/or the like. In other words, the search filter 223 can process data stored in a database (e.g., storage device 230) to present to a user a visualization of information compliant with the user request. Information can thus be processed and presented efficiently and in a desired (e.g., tailored, excerpted, reduced size, etc.) format instead of a presenting a list of long video streams (or the long video streams themselves) to users for interpretation/sorting themselves. In other words, the search filter 223 can be used in generating a visualization that highlights specific objects of interests, trajectories of specific objects of interests, and/or an image sequence of video/image frames relevant to the user preferences such that the users do not have to find those specific information themselves. In some cases, if the user requests includes at least one condition for information about a specific person, the search filter 223 can retrieve trajectories (e.g., tracklets, track, path, etc.) of that person. In some implementations, the search filter 223 can includes a range of parameters that users can adjust, such as, for example, an object of interest(s), region(s) of interest, time window(s) of interest, and/or the like, such that the search filter 223 can generate search results that match/satisfy the user request.

In some implementations, the processor 214 can aggregate trajectories that overlap with at least one feature (e.g., specific object of interest, specific region of interest, specific timestamp, number of objects, etc.) based on trajectory data (e.g., bounding box data, time window, etc.) to identify at least one event. In some cases, an event can refer to a moment of a condition from the user request. In other words, an event can include a visual representation of trajectories that best satisfy the user request. For example, if the condition in the user request includes a person, the compute device can aggregate trajectories captured and stored in the database of that person to form the event. In some cases, the event can be formed based on an aggregation of detections that satisfies the user request (e.g., specific object of interest, specific region of interest, etc.).

The thumbnail extractor 227 can be executed by the processor 214 to extract a thumbnail image from the search results processed by the search filter 223. In some implementations, the thumbnail extractor 227 can be configured to select and/or identify a preview image time based on a positioning of a detected object within a display area associated from filtered set of trajectories associated with the detected object and resulting from the query in response to the user request. In some implementations, the processor 214 and/or the thumbnail extractor 227 can be configured to interpolate stored bounding box data associated with the preview image time to identify a bounding box of interest (e.g., the bounding box for the detected object). Interpolation can include estimating location of an object as described by a bounding box of the object (e.g., bounding box data) at a specific point in time (e.g., preview image time). In some cases, the compute device can interpolate the stored bounding box data to fill in missing or incomplete data to generate a more accurate and/or precise location, trajectory, and/or speed of an object. For example, if an object is detected at video/image frame 1 and video/image frame 10, but not at video/image frames 2-9, the compute device can be used to estimate the position and/or at those missing video/image frames based on bounding box data (e.g., observed movement and speed of the object) in the video/image frames where it was detected.

In some implementations, the thumbnail extractor 227 can extract a video/image frame (e.g., thumbnail or thumbnail image) associated with a bounding box of interest. In some implementations, the processor 214 and/or the thumbnail extractor 227 can be configured to use the bounding box of interest to generate a preview image clip that includes a video stream segment associated with the preview image time. In other words, the processor 214 can align the preview image time with a video stream segment saved in a database and process the video stream segment (e.g., decryption, decoding, etc.) to extract the thumbnail image.

Figure 3:
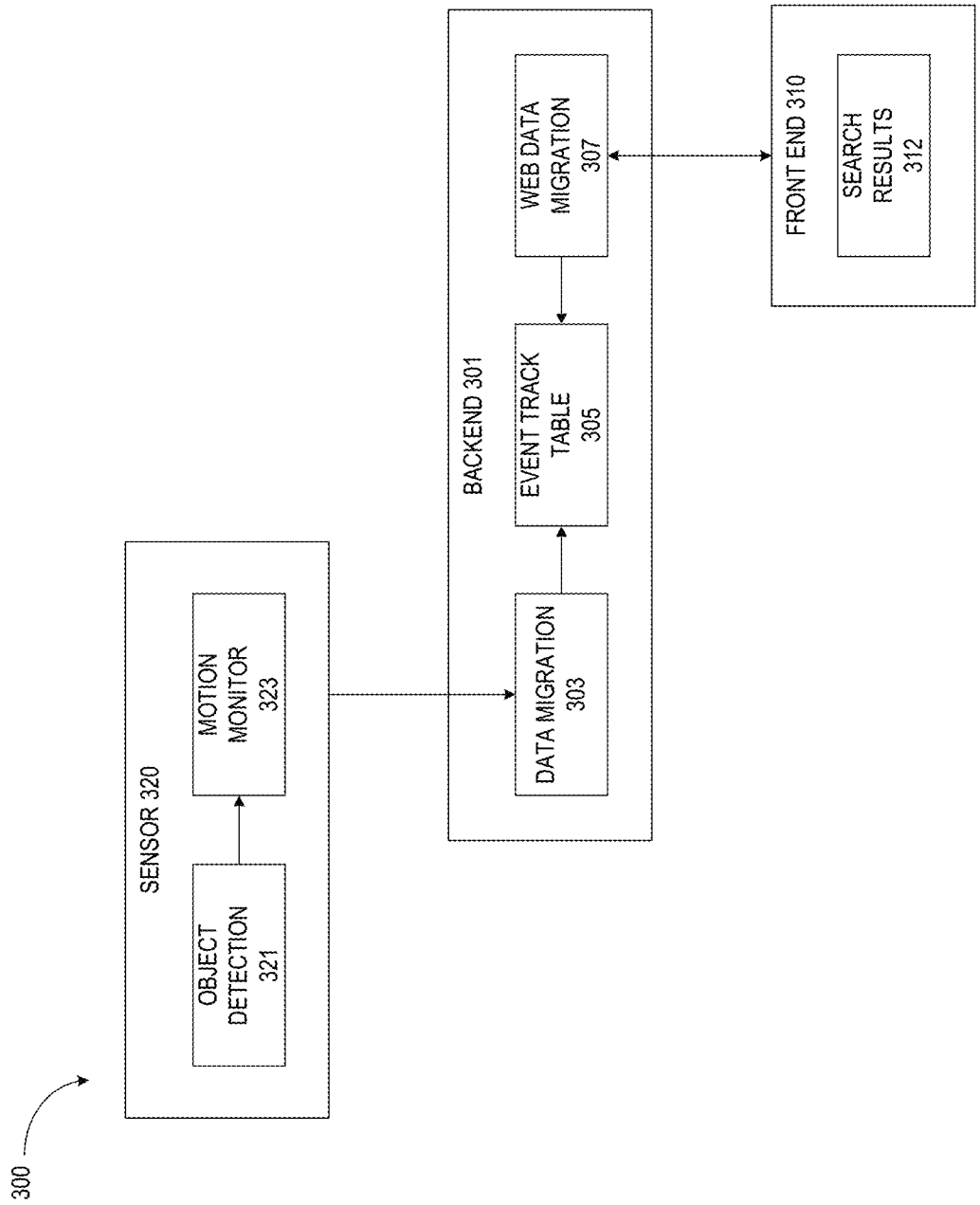
FIG. 3 is a schematic illustration of a system for trajectory-based object search, according to some embodiments.

FIG. 3 is a schematic illustration of a system 300 for trajectory-based object search, according to some embodiments. The system 300 includes a sensor 320, a backend 301, and a front end 310. The sensor 320 can be consistent with the sensor(s) 120 of FIG. 1. In some implementations, the backend 301 can be consistent with the compute device 101 of FIG. 1 and/or the compute device 200 of FIG. 2. In some implementations, the front end 310 can be consistent with the user compute device 110 of FIG. 1.

The sensor 320 in the system 300 can include modules, processes, programs, devices, and/or functions such as, for example, object detection 321 and motion monitor 323. The object detection can include detecting objects and/or extracting tracking information of objects. The object detection can include the use of one or more object detection models, such as the YOLOX model for object detection for PyTorch®. The motion monitor 323 can including aggregating detections from the object detection 321 to produce trajectories (e.g., tracklets) and/or filtering out static objects. The sensor 320 can be or include a camera (e.g., a video camera).

In some implementations, the sensor 320 can perform edge computing to process and/or analyze data of objects such that the data can be processed at the sensor 320 instead of at a centralized location (e.g., backend 301). Moving objects may thus be efficiently identified, moving objects may be efficiently tracked, and/or data associated with moving objects may be efficiently generated, in real-time or substantially in real-time, without the need to transmit large amounts of data to the centralized location (e.g., backend 301) for analysis. As such, latency may be reduced and/or motion detection may be faster. The sensor 320 can be deployed on various infrastructures such as, for example, streetlights, buildings, roofs, and/or the like, to monitor traffic, pedestrian activity, and/or environmental conditions. Objects can be detected locally (e.g., at location of the camera and/or environment) to track objects, determine traffic of objects, and/or the like in real-time or substantially in real-time.

The front end 310 can include search results 312 which can be generated by the backend 301 and presented on a GUI of the front end 310. The backend 301 can include modules, processes, programs, devices, and/or functions such as, for example, data migration 303, event track table 305, and/or a web data migration 307. The data migration 303 can be executed to retrieve data from the motion monitor 323. The event track table 305 can include a table that stores data from the motion monitor 323 and/or the sensor 323 in response to receiving data via the data migrater 303. The web data migration 307 can be executed via the front end 310 to store the search results 312 in the event track table 305.

Figure 4:
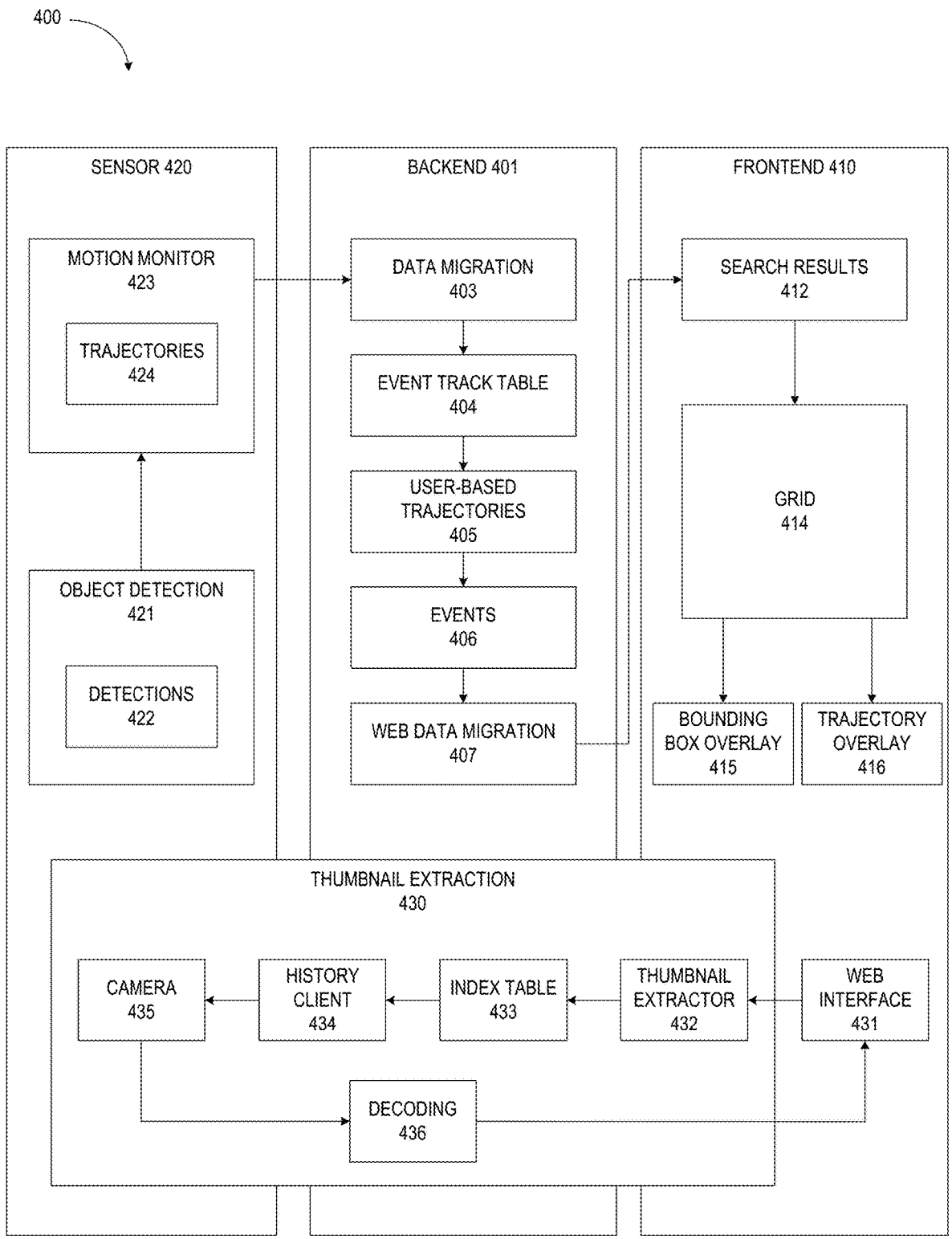
FIG. 4 is a schematic illustration of a system for trajectory-based object search including a thumbnail extractor, according to some embodiments.

FIG. 4 is a schematic illustration of a system 400 for trajectory-based object search including a thumbnail extractor, according to some embodiments. The system 400 can include a sensor 420, a backend 401, a frontend 410, and/or a thumbnail extraction component 430. The sensor 420, the backend 401, and the frontend 410 can be consistent with the sensor 320, the backend 301, and the frontend 310 of FIG. 3, respectively. The thumbnail extractor 432 can be consistent with the thumbnail extractor 227 of FIG. 2.

The sensor 420 can include modules, processes, programs, devices, and/or functions such as object detection 421 and motion monitor 423. The object detection 421 and the motion monitor 423 can be consistent with the object detection 321 and the motion monitor 323 of FIG. 3, respectively. In some implementations, at the object detection 421, the sensor 420 can capture detections 422 of objects. At the motion monitor 423, the sensor 420 can be configured to generate trajectories 424 (e.g., tracklets). The sensor 420 can be described further in detail in FIG. 5

The backend 401 can include modules, processes, programs, devices, and/or functions such as, for example, data migration 403, event track table 404, user-based trajectories 405, events 406, and/or web data migration 407. The data migration 403, event track table 404, and the web data migration 407 can be consistent with the data migration 303, the event track table 305, and the web data migration 307 of FIG. 3. The backend 401 can be described further in detail in FIG. 6.

The front end 410 can include modules, processes, programs, devices, and/or functions such as, for example, search results 412, results grid layout 414, bounding box overlay 415, trajectory overlay 416, and a web interface 431. The search results 412 can be consistent with the search results 312 of FIG. 3 and/or or any search results as described herein. The frontend 410 can be described further in detail in FIG. 7.

The thumbnail extraction component 430 can be implemented in hardware and/or software, and can include modules, processes, programs, devices, and/or functions such as, for example, a camera 435, a history client 434, index table 433, thumbnail extractor 432, and/or decoding 436. The thumbnail extraction 430 component can be described further in detail in FIG. 8.

Figure 5:
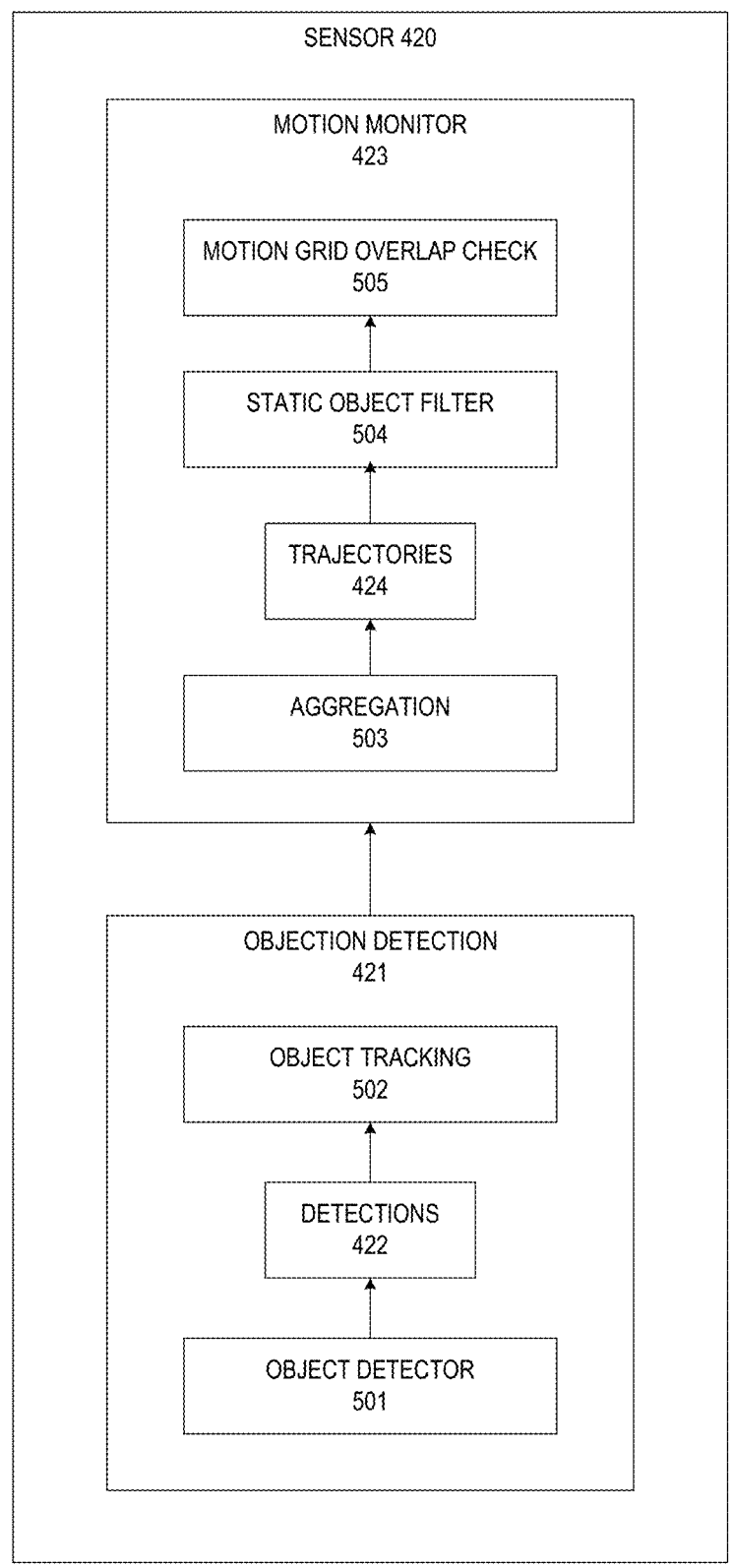
FIG. 5 is an example process diagram for the sensor component of FIG. 4.

FIG. 5 is an example process diagram for the sensor component (e.g., sensor 420) of FIG. 4. The sensor 420 can include modules, processes, programs, devices, and/or functions such as object detection 421 and motion monitor 423. At the object detection 421, an object detector 501 can be configured to scan an environment or scene and capture detections 422 of objects. At object tracking 502, the sensor 420 can use the detections 422 to track moving or stationary objects and/or generate tracking data or motion detection data.

At motion monitor 423, the tracking data or motion detection data from the object detection 421 can be aggregated to generate trajectories 424 of objects. At static object filter 504, the trajectories 424 can be used to filter out static objects. At motion grid overlap check 505, the static objects and/or moving objects can be post-processed to confirm that static objects are static and moving objects are moving. The sensor 420 can be configured to trigger a data migration to send data to a backend.

Figure 6:
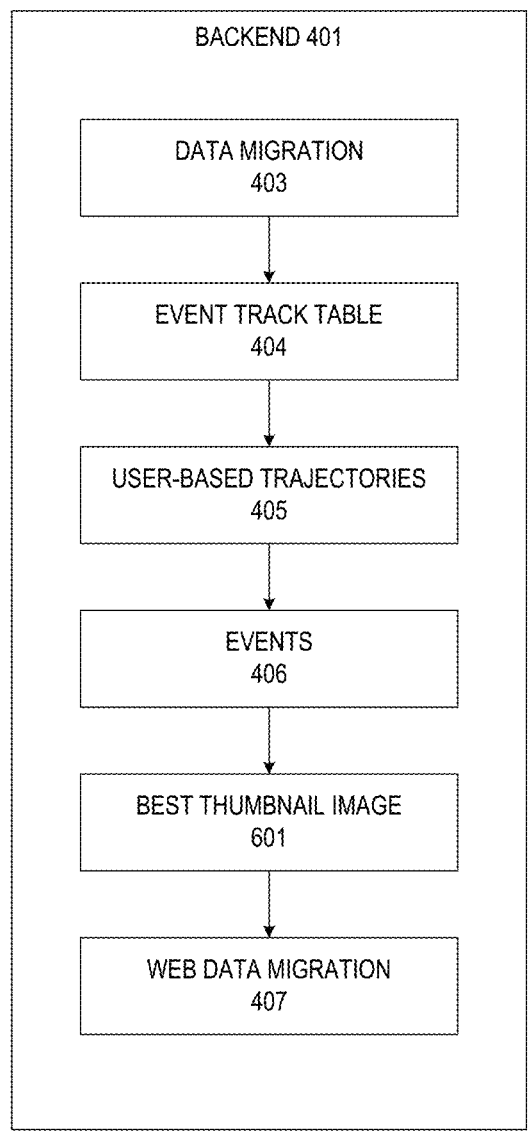
FIG. 6 is an example process diagram for the backend component of FIG. 4.

FIG. 6 is an example process diagram for the backend component (e.g., backend 401) of FIG. 4. The backend 401 can include modules, processes, programs, devices, and/or functions such as, for example, data migration 403, event track table 404, user-based trajectories 405, events 406, and/or web data migration 407. At the data migration 403, the backend 401 can receive data (e.g., detections, trajectories, objects, tracking motion information, etc.) from a sensor. At the event track table 404, data received via the data migration 403 can be stored.

The user-based trajectories 405 can be generated in response to a query that is generated based on a user request. The user-based trajectories 405 can include trajectories based on the user request. The query can include filtering based on conditions of the user request (e.g., region of interest, object of interest, etc.). At the backend 401, the user-based trajectories 405 can be aggregated to produce events 406. The events 406 can be used to select a best thumbnail image 601 based on the user request. The best thumbnail image 601 can be sent/displayed to a user via a GUI of the user's compute device, as part of a search result responsive to the user request. During web data migration 407, the search result(s) can be sent to a frontend (e.g., the GUI of the user compute device).

Figure 7:
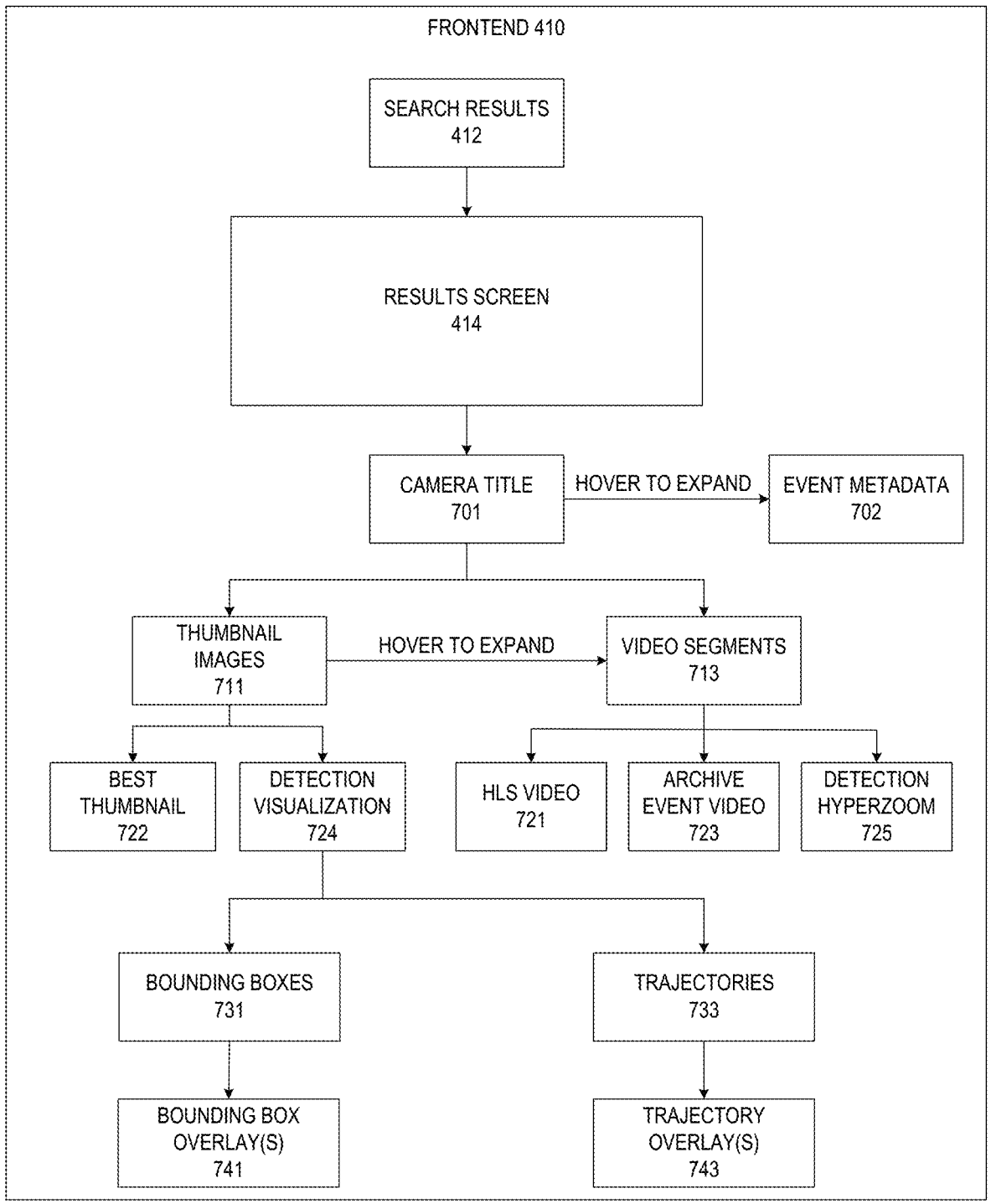
FIG. 7 is an example process diagram for the frontend component of FIG. 4.

FIG. 7 is an example process diagram for the frontend component (e.g., frontend 410) of FIG. 4. At the front end 410, search results 412 can be received from the backend. The search results 412 can be presented via a results screen 414 that can include a grid or grid layout of thumbnail images 711 that match/satisfy the user request on a GUI. The results screen 414 can be presented on the GUI operated by a user to view a visualization of the search results 412.

The results screen 414 can include a camera title 701. The camera title 701 can be an identifier for a sensor used to capture the thumbnail images 711 in the results screen 414. The camera title 701 can also include information such as, for example, event metadata 702. In some cases, a user interface such as, for example, a cursor, can hover and/or click on the camera title 701 such that information including the event metadata 701 can appear, become visible, and/or become expanded. The event metadata 702 can include additional information associated with an event associated with detected object resulting from a user request, such as, for example, location, size, shape, and/or the like. In some cases, the event metadata 702 can also include one or more bounding boxes of objects, one or more tracking identifiers of objects, one or more detection confidence scores of objects, one or more event durations, one or more event start times, one or more event end times, and/or the like. A bounding box of an object can be consistent with any bounding box as described herein. A tracking identifier of an object can be or include a bounding box of the object. In some cases, the tracking identifier can include tracking data of an object such as, for example, trajectory data, vector data, pixel data, velocity data, and/or the like. A detection confidence score of an object can be or include a score assigned to an object (or a bounding box for an object) based on a ranking algorithm. The ranking algorithm can be consistent with any ranking algorithm as described herein. In other words, the detection confidence score can describe a score indicating whether a detected object is actually an object and/or a moving object.

The results screen 414 can include multiple thumbnail images 711 and video segments 713, one video segment for each thumbnail image. In some implementations, a cursor can hover and/or click on a portion of a thumbnail image such that a video segment associated with that thumbnail image is expanded and/or executed. In some cases, the thumbnail images 711 can include a best thumbnail 722, which can be a video/image frame for a video segment that the user views on the results screen 414 presented on the GUI. The thumbnail images 711 can also include a detection visualization 724, which can include bounding boxes 731 (and/or bounding box overlays 741) and trajectories 733 (and/or trajectory overlays 743). The video segments 713 can include an HTTP LiveStreaming (HLS®) video 721, an archive event video 723, and/or a detection hyperzoom 725. The HLS® video 721 can include a streaming protocol to play the archive event video 723. The archive event video 723 can include at least a portion of a video stream associated with a thumbnail image. The detection hyperzoom 724 can include close-up images of objects captured in the archive event video 723.

In other configurations, the processes of the frontend 410 can be performed at a backend of the compute device, in which case the frontend 410 may still present results to a user operating the frontend 410.

Figure 8:
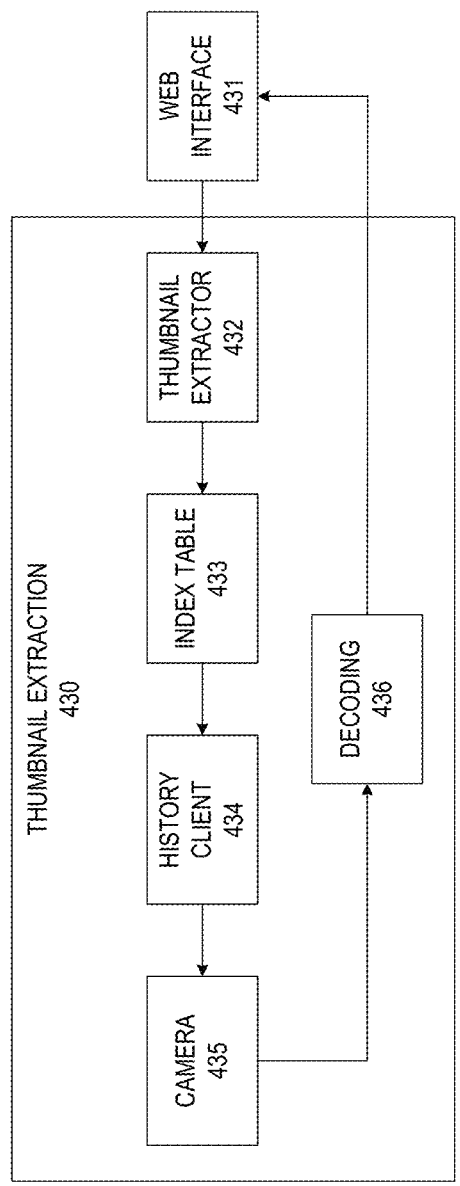
FIG. 8 is a diagram showing an example thumbnail extraction component, according to some embodiments.

FIG. 8 is a diagram showing an example thumbnail extraction component (e.g., thumbnail ex traction 430), according to some embodiments. The thumbnail extraction 430 can be performed by one or more of the frontend 410 of FIG. 7, the backend 401 of FIG. 6, or the sensor 420 of FIG. 5. As shown in FIG. 8, the thumbnail extraction 430 can include modules, processes, programs, devices, and/or functions such as, for example, a thumbnail extractor 432, an index table 433, history client 434, a camera 435, decoding 436, and/or the like.

As part of the thumbnail extraction 430, the thumbnail extractor 432 can be executed in response to a user request received via a web interface 431 which a user can interact with. The thumbnail extractor 432 can be configured to query the index table 433 to cause the history client 434 to extract and/or request data relevant to the user request and captured and/or recorded by the camera 435. During decoding 436, the data can be decoded, decrypted, cropped, and/or cached, which can be used in generating search results to be modified into a visualization to be presented to the user. In some implementations, a backend of the compute device can send a signal to the thumbnail extractor 432 via the web interface 431 to retrieve data for generating search results to satisfy the user request. In some implementations, the data that is decoded, decrypted, cropped, and/or cached can be used to select thumbnail images to be presented to the user via the visualization of the search results.

Figure 9:
FIG. 9 illustrates an example representation of a thumbnail image including overlays, according to some embodiments.

FIG. 9 illustrates an example representation 900 of a thumbnail image 901 including a bounding box 902 (or bounding box overlay) and trajectory 903 (or trajectory overlay), according to some embodiments. In some implementations, the representation 900 can be a representation of a search result responsive to a user request, as discussed herein. For example, the representation 900 can include one event from multiple events of the search result. The representation 900 can include a thumbnail image 1001, a preview image clip 910, and an object image 920.

As shown in FIG. 9, the thumbnail image 901 can include a video/image frame from a video segment. In some implementations, the thumbnail images 901 can include specific video/image frames at a thumbnail time 905 (or preview image time 905). The preview image time 905 can include a time or timestamp of a specific moment or video/image frame within the video segment that is selected to represent the preview image clip 910. In other words, the thumbnail image 901 can be the video/image frame at the preview image time 905. In some implementations, the thumbnail image 901 can be a video/image frame from the video segment and/or the preview image clip 910 that displays the most information (or information that best satisfies the user request). The thumbnail image 901 can be the first image that the user views. For example, if the user request includes a person of interest, the thumbnail image 901 can include a video/image frame from video segments that include the person of interest in which the person of interest is located at the center of the video/image frame. As such, the person of interest may be readily identifiable to the user when the user views the results responsive to the user request via a GUI of the user's compute device. The preview image time 905 can be selected to best visualize the user request.

As shown in FIG. 9, the thumbnail image 900 can include a representation/imagery an object of interest that is overlayed with a bounding box 902 that identifies the object of interest. In other words, the bounding box 902 can be used as a tracker of the object of interest. As shown in FIG. 9, the thumbnail image 901 includes a trajectory 903 of the object of interest where the object of interest is located at the center of the trajectory 903. The trajectory 903 can be a path that the object of interest follows. For example, the trajectory (or path) is already determined based on a video stream captured by sensors that detects the movement of the object of interest and that path that the object of interest takes. The trajectory 903 can be overlayed on the thumbnail image 901 and/or on each video/image frame of an entire video segment of the object of interest to indicate a fixed path that the object of interest traverse. As shown in FIG. 9, depending on the location of the object of interest or the bounding box 902 overlayed on the object of interest, the trajectory 903 can include various colors distinguishing which portions of the trajectory 903 that the object of interest has already traversed at the preview image time 905, portions of the trajectory 903 that the object of interest has yet to take at the preview image time 905, and/or portions of the trajectory 1003 that the object of interest is located at during the preview image time 905. In some implementations, as shown in FIG. 9, the trajectory 903 can include markers that indicate a pace of the object of interest as it moves. For example, a trajectory 903 with a larger number of markers (i.e., markers that are close to each other) can indicate that the object of interest has traversed the trajectory 903 at a slower speed than if that trajectory 903 had a lower number of markers (i.e., makers that are further apart from each other). In some cases, the markers can be generated based on a predetermined rate in captured video/image frames (e.g., about 10 frames per second).

The preview image clip 910 can include sequence of video/image frames associated with the thumbnail image 901 and/or preview image time 905. The preview image clip 910 can include a video segment from a video stream captured by a sensor. In some implementations, the preview image clip 910 can include a progress bar 911 of a video segment of the preview image clip 910 and can be set at the time of the thumbnail image.

In some implementations, when a user hovers a cursor over and/or clicks the thumbnail image 901 displayed on a GUI, the thumbnail image 901 can be expanded to display additional information about the preview image clip 910. The additional information can include a cropped image 920 of the object of interest. In some instances, the cropped image 920 can include a zoomed and/or cropped image that includes the object of interest. In some cases, the additional information can include multiple cropped images of any detections of objects captured in a display area of the video segment. This is so, at least in part, to quickly and/or easily discover, by the user, a clearer image of objects that appear in the scene (or display area).

Figure 10:
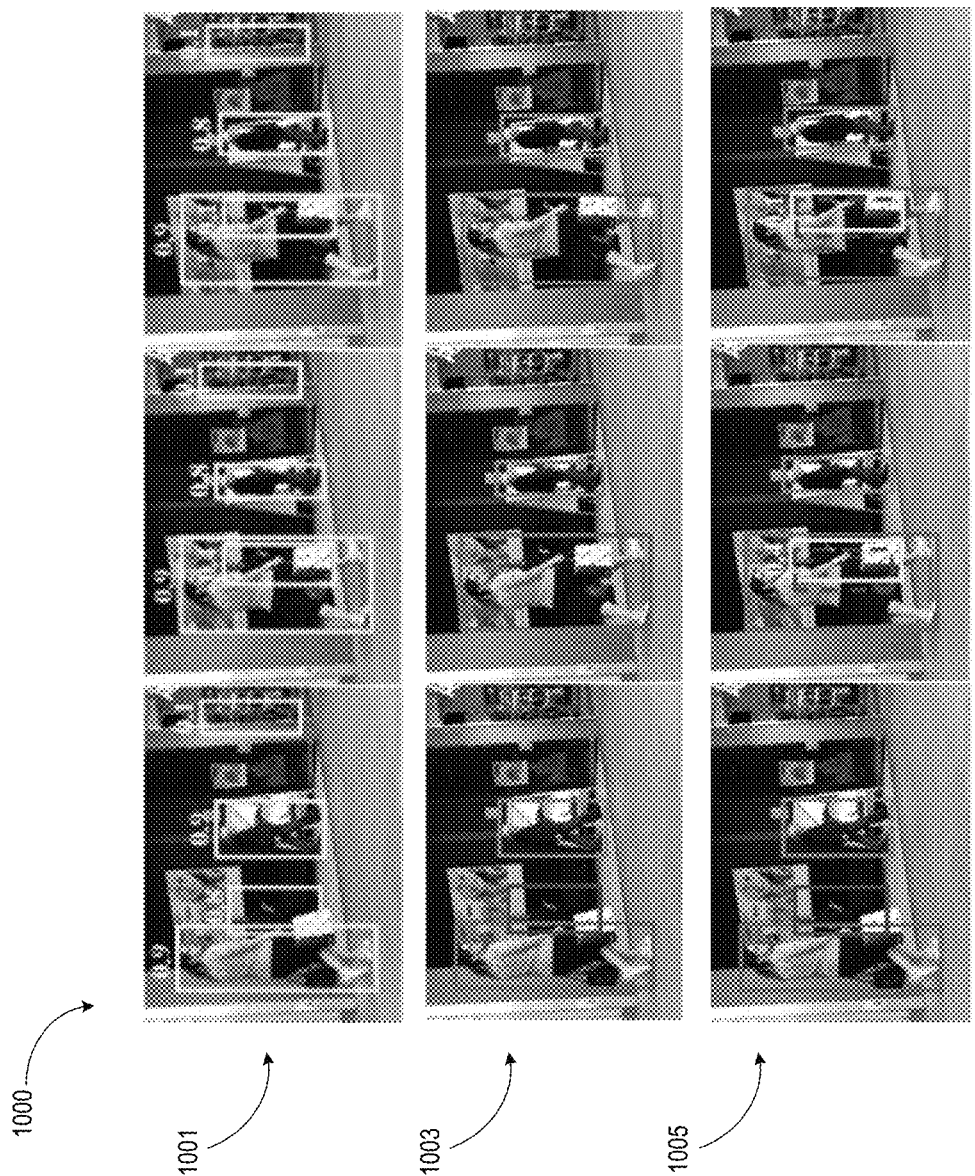
FIG. 10 is an illustrative representation of bounding boxes around objects based on scores, according to some embodiments.

FIG. 10 is an illustrative representation 1000 of bounding boxes around objects based on scores, according to some embodiments. At 1001, a sequence of video/image frames includes images of a scene captured by a camera in a chronological order. At 1001, a compute device can detect objects (e.g., people) and generate bounding boxes to be overlayed over those objects. Each bounding box and/or object can be scored based on a degree of significance of that object with respect to its location in a display are of the video/image frame.

In some cases, the score for a bounding box (or object) in a video/image frame can be based on the information about that bounding box (or object) and/or information in previous video/image frames. For example, an object that stays at the same location and/or position as that same object in a previous video/image frame (or previous video/image frames) can be assigned the same score based on no change to feature vector for that object, indicating no motion, which can be interpreted by the processor of the camera to be stationary. In some cases, objects that move either horizontally across the same plane or a perpendicular frame (i.e., moving closer or further from the camera) can have changing scores based on changing feature vectors for that object, which can indicate that that object is moving. In some instances, the compute device can determine if an object is behind another object and maintain the bounding box for that object until it reappears in a different video/image frame. Bounding boxes (or objects) that are covered by another object based on the position of a camera can be assigned a lower score. In some cases, objects that are stationary can be assigned a lower score than objects that are moving.

At 1003, the sequence of video/image frames can include bounding box overlays over certain objects (via some filter) such as, for example, people. Each person and/or bounding box overlay of each person can be a different color to distinguish each person from each other. At 1005, the compute device can determine, based on previous video/image frames, whether an object exists behind another object. For example, a moving object located closer to the camera can obfuscate other objects. The compute device can maintain a bounding box overlay of objects that get obfuscated to track that object.

Figure 11:
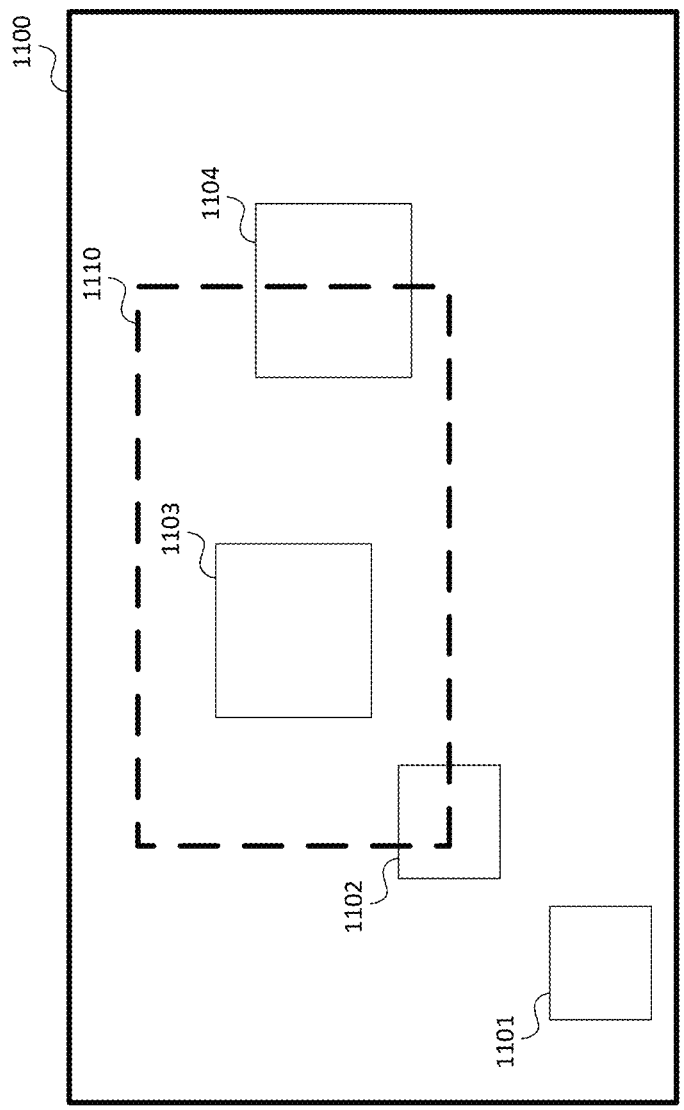
FIG. 11 is a diagrammatic illustration of thumbnail selection based on a user's region of interest, according to some embodiments.

FIG. 11 is a diagrammatic illustration of thumbnail selection based on a user's region of interest, according to some embodiments. As shown in FIG. 11, a display area 1100 can include a dimension of video streams and/or sequences of video/image frames that a camera captures (based on the hardware of the camera). In some cases, the display area 1100 can have the same dimensions as a video/image frame. A user can select a region of interest 1110 as part of a user request in which a compute device can process the request and retrieve detections of objects found within the region of interest 1110. As shown in FIG. 11, the region of interest 1110 is represented as dashed lines to indicate a user-selected region.

In some implementations, the display area 1100 can include multiple detections 1101, 1102, 1103, 1104. Based on the region of interest 1110, the compute device can retrieve detections of objects in the region of interest 1110 such as detection 1103, detection 1102, and/or detection 1104.

Figure 12:
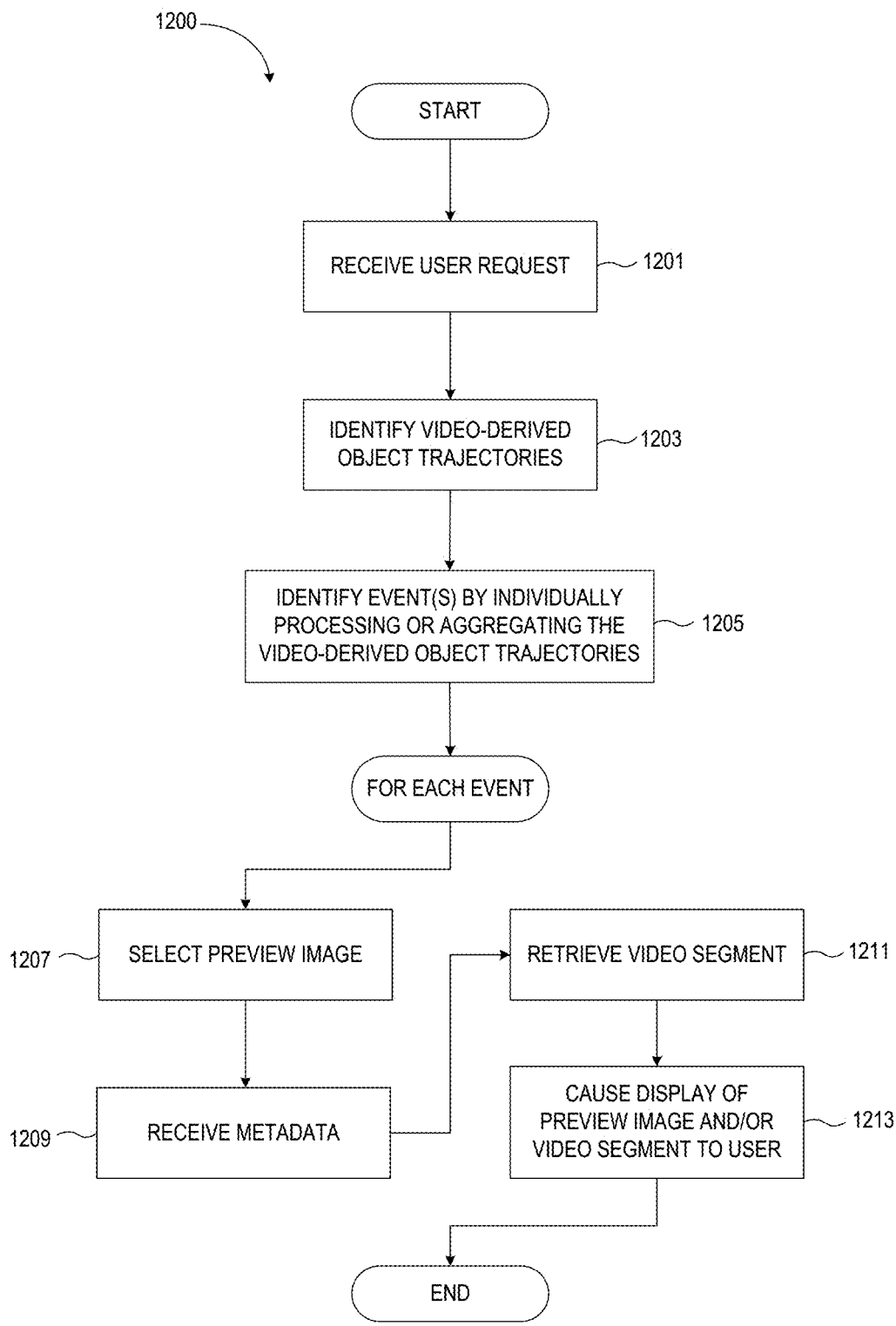
FIG. 12 is a flow diagram of a computer-implemented method for identifying events based on trajectories, according to some embodiments

FIG. 12 is a flow diagram of a computer-implemented method 1200 for identifying events based on trajectories, according to some embodiments. In some cases, the method 1200 can be performed automatically by a processor of a camera (e.g., a video camera). In other words, the processor may be positioned/housed within, or otherwise "onboard," a video camera. In some cases, the camera can include the sensor 420 of FIG. 4 or FIG. 5.

At 1201 the method 1200 can include receiving, at the processor, a user request that includes a representation of at least one of: a geographic region of interest, a time period of interest, or an object of interest. The geographic region of interest can be similar to, for example, the region of interest 1100 of FIG. 11. In some implementations, the geographic region of interest can be or include a portion of a display area. The display area can be or include a dimension of a scene or environment captured by the camera. In some implementations, the method 1200 can include receiving the user request from a user operating a user compute device. In some implementations, the user request can include a representation of two objects of interest including the object of interest.

At 1203, the method 1200 includes identifying, via the processor and based on the user request, a set of video-derived object trajectories (also referred to herein as "trajectories" or "object trajectories") based on the user request. In some implementations, the processor can retrieve the set trajectories from a storage device that is remote from, but communicatively coupled to, the camera. In some cases, the set trajectories can be defined based on data from at least one sensor of the camera. In some cases, the set trajectories can be derived based on data from at least one sensor of a video camera.

In some embodiments, the method 1200 can also include retrieving a set of video/image frames associated with the set of trajectories. The video/image frames can be or include a sequence of video/image frames and/or or individual video/image frames that include information relevant to the user request. For instance, if the user request specifies a geographic region of interest (of a scene), the method 1200 can include retrieving video/image frames in which moving objects were detected (or appeared) in that geographic region of interest. In some cases, the resulting video/image frames retrieved can be continuous sequence of video/image frames or snippets of image frames extracted that include one or more object detections.

At 1205, the method 1205 includes identifying, via the processor and based on the set of trajectories, at least one event, by (1) processing each trajectory from the set of trajectories (e.g., individually and/or serially), or (2) aggregating trajectories from the set of trajectories and that overlap with respect to at least one feature (e.g., a specific object of interest, a specific region of interest, a specific timestamp, a number of objects, etc.), e.g., based on trajectory data (e.g., bounding box data, time window, etc.). In some cases, the method 1200 can include aggregating the trajectories such that they are associated with the overlapping at least one feature. In some cases, the set of trajectories retrieved and/or the aggregated set of trajectories can be used to identify at least one event. In some implementations, an event can refer to a sequence of video/image frames that matches/satisfies the user request. In other words, an event can include a visual representation of trajectories that best satisfy the user request. For example, if an object of interest in the user request includes a person, the processor can be configured to aggregate trajectories captured and stored in the database of that person to form the event. In some implementations, the event can be formed based on an aggregation of detections that satisfies the user request (e.g., specific object of interest, specific region of interest, etc.). In some cases, the method 1200 can include receiving multiple trajectories for each user request from a set of user requests, such that the processor can be caused to generate multiple aggregate set of trajectories for each user request.

In some cases, some events can overlap with each other or are similar to each other. As such, overlapping events can be combined to a single event to reduce computational overhead, save storage space, and/or reduce redundant and/or duplicate events. For example, two people moving the same direction, velocity, and/or vicinity can be originally determined to be two events. As both people appear and/or leave a scene at the same time and sharing similar features (e.g., motion vector, speed, location, etc.), the processor can combine the two events into one event while each person is still distinguished by their own features.

For each event from the at least one event, at 1207, the method 1200 includes selecting a preview image, via the processor, based on the user request and using a ranking algorithm. The preview image can include a thumbnail image, a video frame, or an image frame. In some cases, the method 1200 can include assigning a ranking, via the ranking algorithm, to assign a ranking (or a score) to each thumbnail image, video frame, or image frame (or a subset thereof). In some cases, retrieved video/image frames can be referred to as thumbnail images (also referred to herein as "thumbnails") that can be selected from to best represent the geographic region of interest. In some cases, the thumbnail image that best represents the geographic region of interest can include a video/image frame with a number of moving objects located closest (or closer) to the center of the geographic region of interest.

In some instances, if the user request specifies a video stream for a time period of interest such as, for example, between 10:00 AM to 2:00 PM of a specific day, the method 1300 can include retrieving video/image frames captured between the time period of interest from the video stream. In some cases, a sequence of video/image frames between a time period, time window, or timeframe of a video stream can refer to a video segment. In some cases, if the user request includes a time period of interest for multiple video segments and/or multiple days, the method 1200 can retrieve video/image frames within the time period of interest (e.g., video segment) from the video stream. The method 1200 can include ranking each video/image frame from the video segment based on amount of information in each video/image frame in the video segment. In some cases, video/image frames with one or more moving objects closer to the center of a scene in the video/image frames can be ranked higher, in which the highest ranked video/image frame can be selected to be the preview image.

In some implementations, each trajectory retrieved in response to the user request can be scored based on how well that trajectory matches/satisfies the user request. For example, a trajectory that includes an indication of an object (or detection of an object) closer to the center of the trajectory (or closer to the center of the video/image frame associated with the trajectory at a shared timestamp) can be ranked higher than trajectories that include an indication of the object further from the center of the video/image frame. As such, the trajectory, associated timestamp, and/or video/image frame that best visualizes the object of interest (as indicated by the user request) can be identified, isolated, and/or highlighted (e.g., returned as part of a response to the user request). In some implementations, if the user request specifies a display area (e.g., region of interest), video/image frames and/or timestamps of a video segment that includes a higher number of trajectories (e.g., more detections of objects) can be ranked higher than video/image frames and/or timestamps of the video segment that includes a lesser number of trajectories (e.g., fewer detections of objects). As such, the trajectory that best matches/satisfies the user request may be displayed to the user. The timestamp of the trajectory ranked the highest based on the location and/or information of the object on the trajectory at the timestamp can be selected to be the preview image time. In some cases, a processor at a compute device located remotely from the processor of the camera can be configured to extract the preview image time.

In some cases, the video/image frame selected to be the preview image can be identified based on one of a degree of centrality of a moving object (or object) within a display area, a location of the moving object of interest, a duration associated with the at least one event, or a number of objects of interest depicted within a video/image frame. For example, an object (or detection of an object) closer to the center of the video/image frame can be ranked higher than trajectories that include an indication of the moving object further from the center of the video/image frame. In some cases, the video/image frame retrieved can include a video/image frame that includes the moving object detected and that is the middle video/image frame of a video segment.

In embodiments, selecting the preview image can include selecting a preview image time based on a bounding box associated with a preview image time. The preview image time can be or include a timestamp of the trajectory (or video/image frame) ranked the highest based on the location and/or information of the object on the trajectory at the timestamp. In some implementations, the video/image frame retrieved can be the video/image frame captured at the preview image time. In some implementations, if the use request includes a representation of two object so interest, the video/image frame can be identified based on interpolation of a location of at least one object of interest from the two objects of interest.

The method 1200 also includes, for each event from the at least one event (e.g., for each significant event associated with an object), at 1209, retrieving and/or receiving event metadata associated with the preview image. In some cases, the event metadata can include information associated with the event such as, for example, location of an object and/or trajectory specified by the event, shape of the object and/or trajectory specified by the event, size of the object and/or trajectory specified by the event, and/or the like. In some cases, the event metadata can include tracking data and motion data of an object identified in an event. In some embodiments, the event metadata can be identified by interpolating trajectory data associated with a time of the preview image. The event metadata includes but is not limited to bounding boxes of objects, tracking id of objects, detection confidence of objects, event duration, event start/end time For each event from the at least one event, at 1211, the method 1200 can include retrieving, from a memory operably coupled to the processor, a video segment associated with the event. The video segment can be at least a portion of a video stream captured by the camera. For example, the video segment can include a cropped time window of the video stream that includes information that is relevant to the user request. The video segment can include a sequence of video/image frames that include the video/image frame (e.g., thumbnail image) associated with the preview image time.

In some embodiments, the method 1200 can include, for each event from the at least one event, generating a preview image clip that includes the preview image and/or the video segment. In some implementations, the method 1200 can include generating two preview image clips based on the user request including the representation of two objects of interest including the object of interest. The video/image frame, that can be used to generate the preview image clip, can depict the two objects of interest.

For each event from the at least one event, at 1213, the method 1200 can include causing display of the preview image (or preview image clip), or of the video segment, to a user associated with the user request. In some implementations, the user can operate a user compute device (e.g., frontend) that includes a GUI. The preview image can be presented on the GUI for the user to view. In some implementations, the GUI can initially display the preview image with the video/image frame (e.g., thumbnail image) as the video/image frame that the user views first, such that the video/image frame transitions to the video segment in response to a user interaction with the video frame. The user interaction can include hovering a cursor of over a portion of video/image frame and/or clicking the video/image frame.

Figure 13:
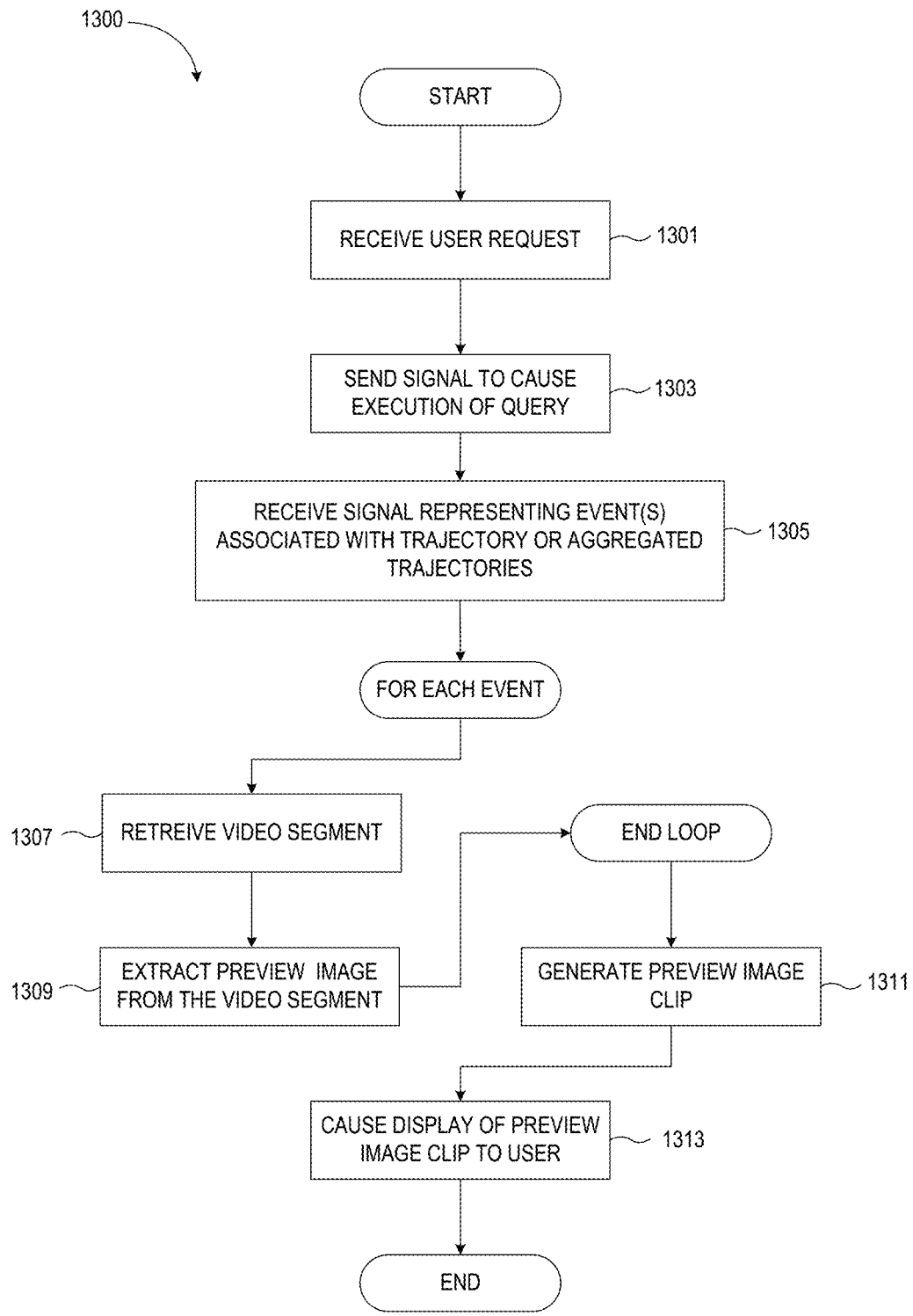
FIG. 13 is a flow diagram of a computer-implemented method for extracting a thumbnail based on a user request, according to some embodiments.

FIG. 13 is a flow diagram of a computer-implemented method 1300 for extracting a thumbnail based on a user request, according to some embodiments. In some implementations, the method 1300 can be performed automatically by a compute device (e.g., compute device 101 of FIG. 1 or FIG. 2) and/or backend (e.g., backend 401 of FIG. 4 or FIG. 6). In some implementations, the method 1300 can be performed automatically by a processor at a camera.

At 1301, the method 1300 includes receiving, at a processor of the compute device, a user request including a representation of at least one of a geographic region of interest, a time period of interest, or an object of interest. The geographic region of interest can be consistent with the region of interest 1100 of FIG. 11. In some implementations, the geographic region of interest can be or include a portion of a display area. The display area can be or include a dimension of a scene or environment captured by the camera. In some implementations, the method 1300 can include receiving the user request from a user operating a user compute device. In some implementations, the user request can include a representation of two objects of interest including the object of interest.

At 1303, the method 1300 includes sending, via the processor, a signal to causing execution of a query. In some cases, the query can be executed to identify at least a trajectory from a set of trajectories based on the user request. A trajectory can include trajectory data describing motion of detected moving objects. In some instances, the trajectory data can include feature vectors describing positions of objects and/or how the positions of the objects changes over time. The information in the feature vectors can include a two-dimensional (2D) vector describing magnitude and/or direction of an object. In some implementations, the motion detection data can include data captured at a rate of between 0.1 and 1,000 frames per second by the camera. In some implementations, the trajectory data can be generated using at least one sensor of the camera (e.g., video camera).

In some embodiments, the query can include a query of a database that stores trajectories/trajectory data and motion detection data. In some implementations, the query can result in a retrieval of trajectories satisfying the user request. For instance, if the user requests includes at least one condition for information about a specific person, the processor can retrieve trajectories (e.g., tracklets, track, path, etc.) of that person.

At 1305, the method 1300 includes receiving, at the processor, a signal representing at least one event. In some cases, the event can be identified based on the trajectory data. In some embodiments, each event from the at least one event can be associated with (1) a trajectory from a set of trajectories or (2) an aggregated set of trajectories from the set of trajectories. In some cases, the processor can aggregate the set trajectories, that are associated with the trajectory data and/or specified by the user request, that overlap with at least one feature (e.g., specific object of interest, specific region of interest, specific timestamp, number of objects, etc.) based on trajectory data (e.g., bounding box data, time window, etc.) to identify at least one event. In some cases, the trajectory data can include data captured (via one or more sensors of one or more cameras) at a rate between about 0.1 frames per second and about 1000 frames per second. In some cases, the trajectory data can be generated using at least one sensor of a video camera and be generated at a processor of the video camera.

In some implementations, an event can refer to a sequence of video/image frames that match/satisfy the user request. In other words, an event can include a visual representation of trajectories that best satisfy the user request. For instance, if the condition in the user request includes a person, the processor can aggregate the set of trajectories captured and stored in the database to form the event. In some implementations, the event can be formed based on an aggregation of detections that satisfies the user request (e.g., specific object of interest, specific region of interest, etc.). In some implementations, the method 1300 can include aggregating each trajectory from the set of trajectories retrieved in response to the execution of the query and with respect to at least one feature to produce the aggregated set of trajectories. The set of trajectories retrieved and/or the aggregated set of trajectories can be used to identify at least one event.

The method 1300 also includes, at 1307, for each event from the at least one event, retrieving via the processor a video segment based on the user request. The video segment can be at least a portion of a video stream captured by the camera. For example, the video segment can include a cropped time window of the video stream that includes information that is relevant to the user request. In some instances, the video segment can represent a portion of a video stream that matches/satisfies the user request.

The method 1300 also includes, at 1309, for each event from the at least one event, extracting, via the processor, a preview image from the video segment. In some implementations, the preview image can be extracted via a thumbnail extractor similar to the thumbnail extractor 430 of FIG. 4 or FIG. 8. In some implementations, extracting the preview image from the video segment can include aligning the video segment with a video/image frame associated with a preview image time. In some implementations, prior to extracting the preview image, the preview image can be decrypted and/or decoded. In some implementations, the preview image can be identified based on at least one of a degree of centrality of the object of interest within a display area, a location of the object of interest, a duration associated with the at least one event, or a number of objects of interest depicted within a video/image frame of the video segment.

In some implementations, the preview image can include a thumbnail image or a video/image frame. In some cases, the method 1300 can include assigning a ranking, via the ranking algorithm, to assign a ranking (or a score) to each video/image frame. In some cases, the retrieved video/image frames can be referred to as thumbnail images (also referred to herein as "thumbnails") that can be selected to best represent the geographic region of interest. In some cases, the thumbnail image that best represents the geographic region of interest can include a video/image frame with a number of moving objects located closest (or closer) to the center of the geographic region of interest.

At 1311, the method 1300 includes generating a preview image clip that includes the preview image and the video segment. In some implementations, the method 1300 can include generating two preview image clips based on the user request including the representation of two objects of interest including the object of interest. The video/image frame, that can be used to generate the preview image clip, can depict the two objects of interest.

At 1313, the method 1300 includes causing display of the preview image clip to a user associated with the user request. In some implementations, the user can operate a user compute device (e.g., frontend) that includes a GUI. The preview image clip can be presented on the GUI for the user to view. In some implementations, the GUI can initially display the preview image clip with the video/image frame (e.g., thumbnail image) as the video/image frame that the user views first, such that the video/image frame transitions to the video segment in response to a user interaction with the video frame. The user interaction can include hovering a cursor of over a portion of video/image frame and/or clicking the video/image frame.

Figure 14:
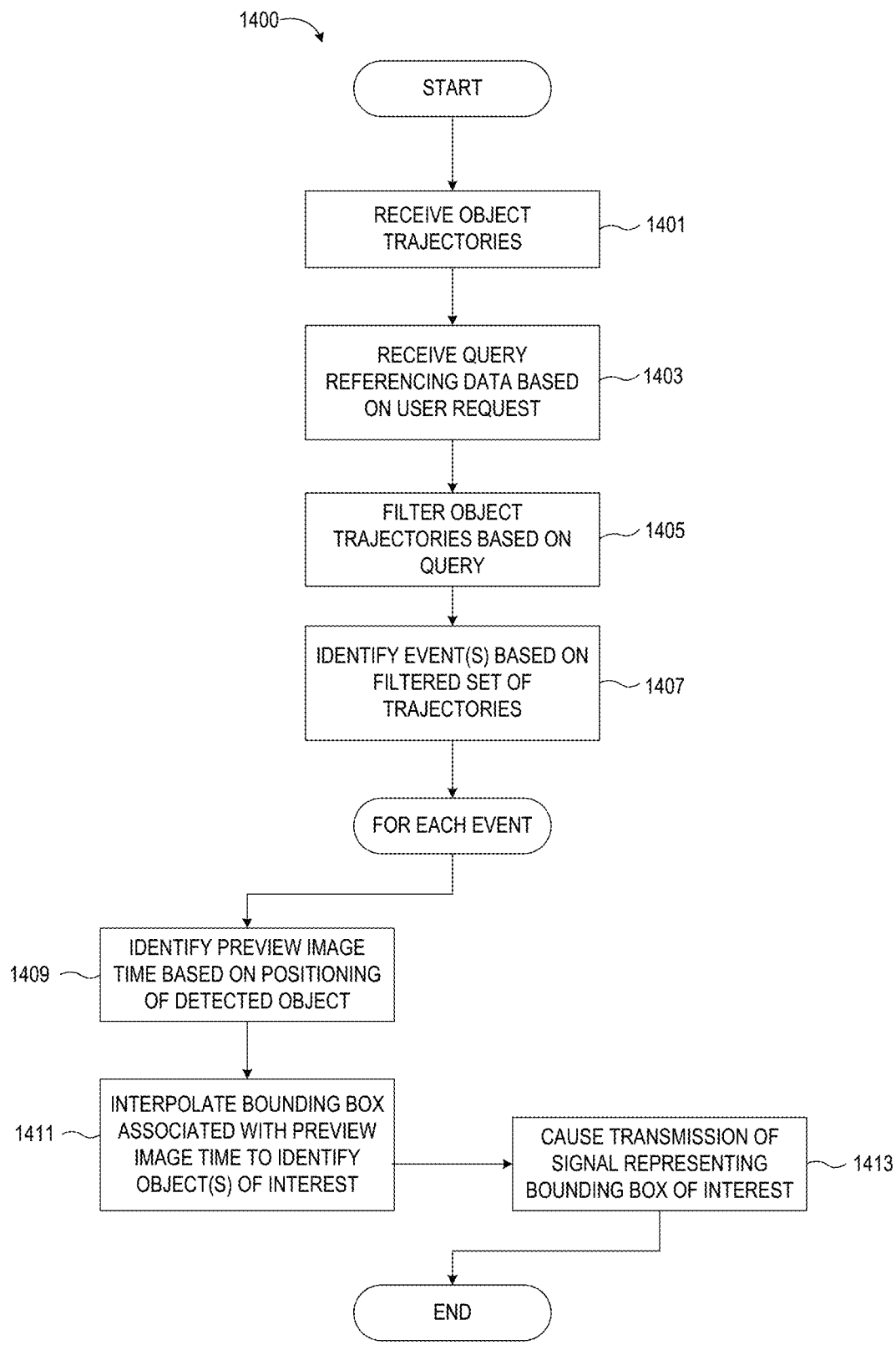
FIG. 14 is a flow diagram of a computer-implemented method for interpolating detections to generate a preview image clip, according to some embodiments.

FIG. 14 is a flow diagram of a computer-implemented method 1400 for interpolating detections to generate a preview image clip, according to some embodiments. In some implementations, the method 1400 can be performed automatically by a compute device (e.g., backend) and that is located away from a camera.

At 1401, the method 1400 includes receiving, via a processor at the compute device, a set of object trajectories. An object trajectory can also be referred to herein as a "trajectory." In some implementations, a trajectory from the set of trajectories can include trajectory data. In some cases, the trajectory data for a trajectory can include motion detection data that describes detections of moving objects, bounding boxes of moving objects, features (or feature vectors) of moving objects, and/or the like. In some implementations, the trajectory data can include filtered data such that detections of static objects (or data of static objects) are excluded in the filtered data. In some implementations, the trajectory data can include data captured at a rate of about 10 frames per second by the camera (e.g., video camera).

In some implementations, a trajectory can indicate a path that an object has traversed (or will have traversed). In some implementations, the camera can aggregate tracked motion data (e.g., motion detection data associated with an object) of each object from each video/image frame of a video stream such that the same object across video/image frames are classified and associated into a trajectory. In some implementations, the camera can identify multiple objects in a scene and determine moving objects and static objects based on location of objects (e.g., pixel locations) across multiple frames and/or trajectories for the objects. In other words, objects that without trajectories can be determined to be stationary and/or static objects (e.g., idle people, parked cars, trees, etc.). The camera can filter static objects from moving objects.

In some implementations, the camera can perform post-processing of the filtered data to confirm that objects are static or moving. For example, the post-process can include a motion grid overlap check in which the camera can use computer vision and/or motion tracking to determine if two or more objects in a video stream are overlapping or colliding with each other. The camera can divide each video/image frame into a grid of cells and then calculate the feature vectors for each cell. The feature vectors can include information describing positions of objects and/or how the positions of the objects changes over type. The information in the feature vectors can include a 2D vector describing magnitude and/or direction. In some implementations, the camera can compare feature vectors for neighboring cells in the grid to determine if two or more objects are overlapping and/or intersecting with each other. Objects across video/image frames that nearly completely overlap each other can indicate that those objects are the same object. Intersecting objects across video/image frames (or to some degree of overlap) can indicate motion of a singular object.

In some implementations, the trajectory data can include a set markers on the trajectory of a detected moving object to indicate a speed of that moving object. For example, a trajectory with a larger number of markers (i.e., markers that are close to each other) can indicate that the moving object traversed that trajectory at a slower speed than if that trajectory had a lower number of markers (i.e., makers that are further apart from each other). In some cases, the camera can be configured to set markers based on the predetermined rate in captured video/image frames (e.g., at a rate between about 0.1 and about 1,000 frames per second).

At 1403, the method 1400 includes receiving, at the processor, a query referencing data associated with a user request, the data including a representation of at least one of a geographic region of interest, a time period of interest, or an object of interest. In some implementations, the user request can be received via a user operating a user compute device.

At 1405, the method 1400 includes filtering, via the processor, the set of trajectories based on the query, to produce a filtered set of trajectories. In some implementations, the query can include a query of a database that stores trajectories and trajectory data. In some implementations, filtered set of trajectories can include a result of the query, which can include trajectories satisfying the user request. For example, if the user requests includes at least one condition for information about a specific person, the processor can retrieve trajectories (e.g., tracklets, track, path, etc.) of that person. In some cases, the filtered set of trajectories can include data that excludes data associated with one or more static objects.

At 1407, the method 1400 includes identifying, via the processor and based on the filtered set of trajectories, at least one event having an associated aggregated set of trajectories from a set of trajectories. In some implementations, the processor can aggregate the set trajectories of the filtered set of trajectories and that overlap with at least one feature (e.g., specific object of interest, specific region of interest, specific timestamp, number of objects, etc.) based on trajectory data (e.g., bounding box data, time window, etc.) to identify at least one event. In some implementations the set of trajectories can be aggregated to produce the aggregated set of trajectories based on the trajectory data. The aggregated set of trajectories can be used to identify at least one event.

In some implementations, identifying at least one event can be based on a time overlap between trajectories from the set of trajectories or each trajectory from the aggregated set of trajectories. In some implementations, events can be identified via crowd grouping (e.g., grouping/aggregating of data associated with multiple different trajectories) based on the filtered set of trajectories, optionally in response to detecting/determining that those multiple different trajectories belong to a common "crowd" or group. For example, moving objects in that are within a dense area/crowd can each have their own associated event (e.g., one object per event and/or X thumbnails for X people in a crowd). Optionally, each event for each object in the dense area/crowd can include multiple events that are combined into a single event.

In some implementations, an event can refer to a sequence of video/image frames that match/satisfy the user request. In other words, an event can include a visual representation of trajectories that best satisfy the user request. For example, if the condition in the user request includes a person, the processor can aggregate the set of trajectories captured and stored in the database to form the event. In some implementations, the event can be formed based on an aggregation of detections of objects and/or trajectories that satisfies the user request (e.g., specific object of interest, specific region of interest, etc.).

The method 1400 also includes, at 1409 and for each event from at least one event, identifying a preview image time based on a positioning of a detected object within a display area associated with the filtered set of trajectories. The display area can be a dimension of an image frame. In some cases, the display area can refer to a region of interest specified by the user in the user request. In some implementations, the preview image time can be identified based on a ranking algorithm. In some implementations, if the user request specifies a display area (e.g., region of interest), video/image frames and/or timestamps of a video segment that includes a higher number of trajectories (e.g., more detections of objects) can be ranked higher than video/image frames and/or timestamps of the video segment that includes a lesser number of trajectories (e.g., fewer detections of objects). As such, the trajectory that best matches/satisfies the user request may be displayed to the user. The timestamp of the trajectory ranked the highest based on the location and/or information of the object on the trajectory at the timestamp can be selected to be the preview image time.

The method 1400 also includes, at 1411 and for each event from at least one event, interpolating stored bounding box data associated with the preview image time, to identify at least one object of interest. In some cases, identifying at least the one object of interest can include identifying at least a bounding box of interest that is associated with at least the object of interest. Interpolation can include estimating location of an object as described by a bounding box of the object (e.g., bounding box data) at a specific point in time (e.g., preview image time). In some cases, the method 1400 can include interpolating the stored bounding box data to fill in missing or incomplete data to generate a more accurate and/or precise location, trajectory, and/or speed of an object. For example, if an object is detected at video/image frame 1 and video/image frame 10, but not at video/image frames 2-9, the compute device can be used to estimate the position and/or at those missing video/image frames based on bounding box data (e.g., observed movement and speed of the object) in the video/image frames where it was detected.

The method 1400 also includes, at 1413 and for each event from at least one event, causing transmission of a signal representing the bounding box of interest, for use in generating a preview image clip that includes a video segment associated with the preview image time. The video segment can multiple objects that includes the object of interest.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, subroutines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video stream Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "about" and "approximately" generally mean plus or minus 10% of the value stated, for example about 250 µm would include 225 µm to 275 µm, about 1,000 µm would include 900 µm to 1,100 µm.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory, processor-readable medium storing instructions that, when executed by a processor, cause the processor to:
receive, at a processor, a user request including a representation of at least one of: a geographic region of interest or a time period of interest;
identify, via the processor and based on the user request, a plurality of video-derived object trajectories based on the user request;
identify, via the processor and based on the plurality of video-derived object trajectories, a plurality of events by (1) processing each video-derived object trajectory from the plurality of video-derived object trajectories individually, or (2) aggregating video-derived object trajectories, from the plurality of video-derived object trajectories, that overlap with respect to at least one feature, each event from the plurality of events including a representation of a video-derived object trajectory from the plurality of video-derived object trajectories;
combine at least two spatially overlapping events from the plurality of events to generate at least one event;
for each event from the at least one event:
select a preview image via the processor, the preview image including an image that has been cropped from one of a thumbnail image or a video frame, based on the user request and using a ranking algorithm;
receive, at the processor, event metadata associated with the preview image;
retrieve, from a memory operably coupled to the processor, a video segment associated with that event;
cause display of the preview image via a user device associated with the user request; and
in response to a user interaction with the preview image, cause display of the video segment via the user device associated with the user request.

2. The non-transitory, processor-readable medium of claim 1, wherein the ranking algorithm identifies preview images based on at least one of: at least one bounding box area overlap with the geographic region of interest, a degree of centrality of at least one object of interest within a display area, a location of the at least one object of interest, a duration associated with the at least one event, or a number of objects of interest depicted within the preview image.

3. The non-transitory, processor-readable medium of claim 1, wherein the non-transitory, processor-readable medium is onboard a video camera, and the plurality of video-derived object trajectories is derived based on data from at least one sensor of the video camera.

4. The non-transitory, processor-readable medium of claim 1, wherein the user request includes a representation of two objects of interest, and the preview image depicts the two objects of interest.

5. The non-transitory, processor-readable medium of claim 1, further storing instructions to cause the processor to identify the event metadata by interpolating trajectory data associated with a time of the preview image, the event metadata including at least one of: at least one bounding box associated with at least one object, at least one tracking identifier of the at least one object, at least one detection confidence score of objects, at least one event duration, at least one event start time, or at least one event end time.

6. The non-transitory, processor-readable medium of claim 1, wherein the image has been cropped from the thumbnail image, and the thumbnail image is selected from a plurality of thumbnail images including the thumbnail image.

7. The non-transitory, processor-readable medium of claim 1, wherein the user interaction includes hovering a cursor over the preview image.

8. The non-transitory, processor-readable medium of claim 1, wherein the preview image is selected from a plurality of preview images, the ranking algorithm configured to score and rank each preview image from the plurality of preview images based on how well that preview image satisfies the user request.

9. A non-transitory, processor-readable medium storing instructions that, when executed by a processor, cause the processor to:
receive, at a processor, a user request including a representation of at least one of a geographic region of interest or a time period of interest;
send, via the processor, a signal to cause execution of a query based on the user request;
receive, at the processor and in response to the query, a signal representing a plurality of events, each event from the plurality of events including (1) a trajectory from a plurality of trajectories or (2) an aggregated set of trajectories from the plurality of trajectories;
combine at least two spatially overlapping events from the plurality of events to generate at least one event;
for each event from the at least one event:
retrieve, via the processor, a video segment based on the user request, and
extract, via the processor, a preview image from the video segment;
generate a preview image clip that includes the preview image and the video segment; and
cause display of the preview image clip and a cropped image of an object found in the preview image clip via a user device associated with the user request, the display of the preview image clip including display of the preview image and a transition to the video segment in response to a user interaction with the preview image.

10. The non-transitory, processor-readable medium of claim 9, wherein the preview image is identified with a ranking algorithm based on at least one bounding box area overlap with the geographic region of interest, at least one of a degree of centrality of the object of interest within a display area, a location of the object of interest, a duration associated with the at least one event, or a number of objects of interest depicted within a video frame.

11. The non-transitory, processor-readable medium of claim 9, wherein trajectory data associated with the plurality of trajectories includes data captured at a rate of between about 0.1 frames per second and about 1000 frames per second.

12. The non-transitory, processor-readable medium of claim 9, wherein the non-transitory, processor-readable medium is onboard a video camera, and trajectory data associated with the plurality of trajectories is generated using at least one sensor of the video camera.

13. A non-transitory, processor-readable medium storing instructions that, when executed by a processor, cause the processor to:
  receive, via the processor, a plurality of object trajectories;
  receive, at the processor, a query referencing data associated with a user request, the data including a representation of at least one of a geographic region of interest, a time period of interest, or an object of interest;
  filter, via the processor, the plurality of object trajectories based on the query, to produce a filtered set of trajectories;
  identify, via the processor and based on the filtered set of trajectories, a plurality of events, each event from the plurality of events including a representation of a trajectory from the filtered set of trajectories;
  combine at least two spatially overlapping events from the plurality of events to generate at least one event;
  for each event from the at least one event:
    identify a preview image time based on a positioning of a detected object within a display area associated with the filtered set of trajectories,
    interpolate stored bounding box data associated with the preview image time, to identify at least one object of interest; and
    cause transmission of a signal representing the object of interest, for use in generating a preview image clip that includes (1) a video segment associated with the preview image time, and (2) a cropped image of the at least one object of interest, the video segment associated with the preview image time configured to be displayed (a) after the cropped image of the at least one object of interest, and (b) in response to a user interaction with the cropped image of the at least one object of interest.

14. The non-transitory, processor-readable medium of claim 13, wherein the plurality of object trajectories includes data captured at a rate of between about 0.1 frames per second and about 1,000 frames per second.

15. The non-transitory, processor-readable medium of claim 13, wherein the instructions to identify the plurality of events include instructions to identify the plurality of events based on a time overlap between trajectories from the plurality of object trajectories.

16. The non-transitory, processor-readable medium of claim 13, wherein the instructions to identify the plurality of events include instructions to perform crowd grouping based on the filtered set of trajectories.

17. The non-transitory, processor-readable medium of claim 13, further storing instructions to cause the processor to aggregate trajectories from the plurality of object trajectories to produce an aggregated set of trajectories.

18. The non-transitory, processor-readable medium of claim 13, wherein the instructions to filter the plurality of object trajectories include instructions to exclude data associated with one or more static objects.

19. The non-transitory, processor-readable medium of claim 13, wherein the instructions to identify the preview image time for each event from the at least one event include instructions to identify the preview image time for each event using a ranking algorithm.

20. The non-transitory, processor-readable medium of claim 13, wherein the video segment depicts a plurality of objects of interest that includes the object of interest.

21. The non-transitory, processor-readable medium of claim 13, wherein the instructions to filter the plurality of object trajectories include instructions to exclude data associated with one or more objects that have been stationary for a predetermined period of time.

* * * * *